United States Patent
Ohishi et al.

(10) Patent No.: US 9,912,416 B2
(45) Date of Patent: Mar. 6, 2018

(54) COMMUNICATION DEVICE AND BIOLOGICAL SIGNAL MONITORING DEVICE

(71) Applicant: KABUSHIKI KAISHA TOSHIBA, Tokyo (JP)

(72) Inventors: Takafumi Ohishi, Kanagawa (JP); Kazuhiro Inoue, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/391,003

(22) Filed: Dec. 27, 2016

(65) Prior Publication Data

US 2017/0111124 A1  Apr. 20, 2017

Related U.S. Application Data

(63) Continuation of application No. PCT/JP2014/084647, filed on Dec. 26, 2014.

(30) Foreign Application Priority Data

Jul. 22, 2014 (JP) .................................. 2014-149146

(51) Int. Cl.
*H04B 13/00* (2006.01)
*H04B 1/12* (2006.01)
(Continued)

(52) U.S. Cl.
CPC ............ *H04B 13/005* (2013.01); *H01Q 1/273* (2013.01); *H04B 1/0475* (2013.01); *H04B 1/12* (2013.01); *H04B 5/0012* (2013.01)

(58) Field of Classification Search
CPC ...... H04B 13/005; H04B 5/0012; H04B 1/12; H04B 1/0475; H01Q 1/244; H01Q 1/273
See application file for complete search history.

(56) References Cited

U.S. PATENT DOCUMENTS 6,047,163 A * 4/2000 Miyoshi ................. H01Q 1/273
                                                                  455/100
6,223,018 B1 4/2001 Fukumoto et al.
(Continued)

FOREIGN PATENT DOCUMENTS

JP   H10-229357    8/1998
JP   2001-007735   1/2001
(Continued)

OTHER PUBLICATIONS

Written Opinion dated Feb. 10, 2015 in counterpart International Patent Application No. PCT/JP2014/084647.
(Continued)

*Primary Examiner* — Duc M Nguyen
(74) *Attorney, Agent, or Firm* — Nixon & Vanderhye, P.C.

(57) ABSTRACT

A communication device includes a ground unit, a dielectric plate, a communication circuit, a conductor, and a capacitance element. The ground unit has a reference potential applied to the ground unit. The dielectric plate is provided on the ground unit. The communication circuit is provided on the dielectric plate and performs a transmission and a reception of a signal. The conductor is connected to the communication circuit. An end of the capacitance element is connected to the conductor. An another end of the capacitance element is connected to the ground unit. A capacitance of the capacitance element is smaller than a capacitance formed between the conductor and the ground unit. The capacitance of the capacitance element is bigger than a capacitance formed between the conductor and the ground unit being caused by a human body touching or approximating to the conductor.

20 Claims, 16 Drawing Sheets

(51) Int. Cl.
*H01Q 1/27* (2006.01)
*H04B 1/04* (2006.01)
*H04B 5/00* (2006.01)

(56) References Cited

U.S. PATENT DOCUMENTS

| | | | | |
|---|---|---|---|---|
| 6,362,793 | B1* | 3/2002 | Sawamura | H01Q 1/243 |
| | | | | 343/702 |
| 6,366,247 | B1* | 4/2002 | Sawamura | H01Q 1/244 |
| | | | | 343/702 |
| 6,754,472 | B1* | 6/2004 | Williams | H04Q 9/04 |
| | | | | 455/100 |
| 7,664,476 | B2* | 2/2010 | Yanagida | H04B 13/005 |
| | | | | 340/522 |
| 7,801,483 | B2* | 9/2010 | Minotani | H04B 13/005 |
| | | | | 331/114 |
| 8,213,859 | B2* | 7/2012 | Hebiguchi | H04B 13/005 |
| | | | | 455/41.1 |
| 9,130,273 | B2* | 9/2015 | Kataoka | H01Q 1/273 |
| 9,331,743 | B2* | 5/2016 | Gilad-Bachrach | H04B 5/00 |
| 2013/0278470 | A1 | 10/2013 | Kataoka et al. | |
| 2016/0166207 | A1* | 6/2016 | Falconer | A61B 5/7221 |
| | | | | 600/300 |

FOREIGN PATENT DOCUMENTS

| | | |
|---|---|---|
| JP | 2003-037566 | 2/2003 |
| JP | 2005-94466 | 4/2005 |
| JP | 2013-223160 | 10/2013 |
| WO | WO 2016/013134 | 1/2016 |

OTHER PUBLICATIONS

English-language machine translation of JP2001-007735, Patent dated 2001.
English-language machine translation of JP2003-037566, Patent dated 2003.
International Search Report and Written Opinion of the ISA for PCT/JP2014/084647 dated Feb. 10, 2015, 9 pages.
English-language translation of International Search Report for PCT/JP2014/084647 dated Feb. 10, 2015, 1 page.

* cited by examiner

COMMUNICATION DEVICE AND BIOLOGICAL SIGNAL MONITORING DEVICE

CROSS-REFERENCE TO RELATED APPLICATIONS

This is a continuation application of International Application PCT/JP2014/084647, filed on Dec. 26, 2014. This application also claims priority to Japanese Application No. 2014-149146, filed on Jul. 22, 2014. The entire contents of each are incorporated herein by reference.

FIELD

Embodiments described herein relate generally to a communication device and a biological signal monitoring device.

BACKGROUND

In recent years, communication that utilizes a human body as a portion of a signal transmission line is drawing attention; and a biological communication device has been proposed in which an electromagnetic field is generated between a signal electrode and ground and propagates via the human body surface. However, because the spacing between the signal electrode and ground becomes narrow when downsizing and reducing the thickness of the communication device, the capacitance of the signal electrode becomes high; the return loss increases; and communication becomes difficult.

DETAILED DESCRIPTION

According to one embodiment, a communication device includes a ground unit, a dielectric plate, a communication circuit, a conductor, and a capacitance element. The ground unit has a reference potential applied to the ground unit. The dielectric plate is provided on the ground unit. The communication circuit is provided on the dielectric plate and performs a transmission and a reception of a signal. The conductor is connected to the communication circuit. An end of the capacitance element is connected to the conductor. An another end of the capacitance element is connected to the ground unit. A capacitance of the capacitance element is smaller than a capacitance formed between the conductor and the ground unit. The capacitance of the capacitance element is bigger than a capacitance formed between the conductor and the ground unit being caused by a human body touching or approximating to the conductor.

According to another embodiment, a biological signal monitoring device includes a ground unit, a dielectric plate, a communication circuit, a conductor, a resistance element, a capacitance element, and a biological signal sensor. The ground unit has a reference potential applied to the ground unit. The dielectric plate is provided on the ground unit. The communication circuit is provided on the dielectric plate and performs a transmission and a reception of a signal. The conductor is connected to the communication circuit. The resistance element is connected in series with the conductor. An end of the capacitance element is connected to the conductor in series via the resistance element. An another end of the capacitance element is connected to the ground unit. The biological signal sensor is provided on the dielectric plate and is connected to a signal line connecting the capacitance element and the resistance element. A capacitance of the capacitance element is smaller than a capacitance formed between the conductor and the ground unit. The capacitance of the capacitance element is bigger than a capacitance formed between the conductor and the ground unit being caused by a human body touching or approximating to the conductor.

Embodiments the invention will now be described with reference to the drawings.

First, a first embodiment will be described.

Figure 1:
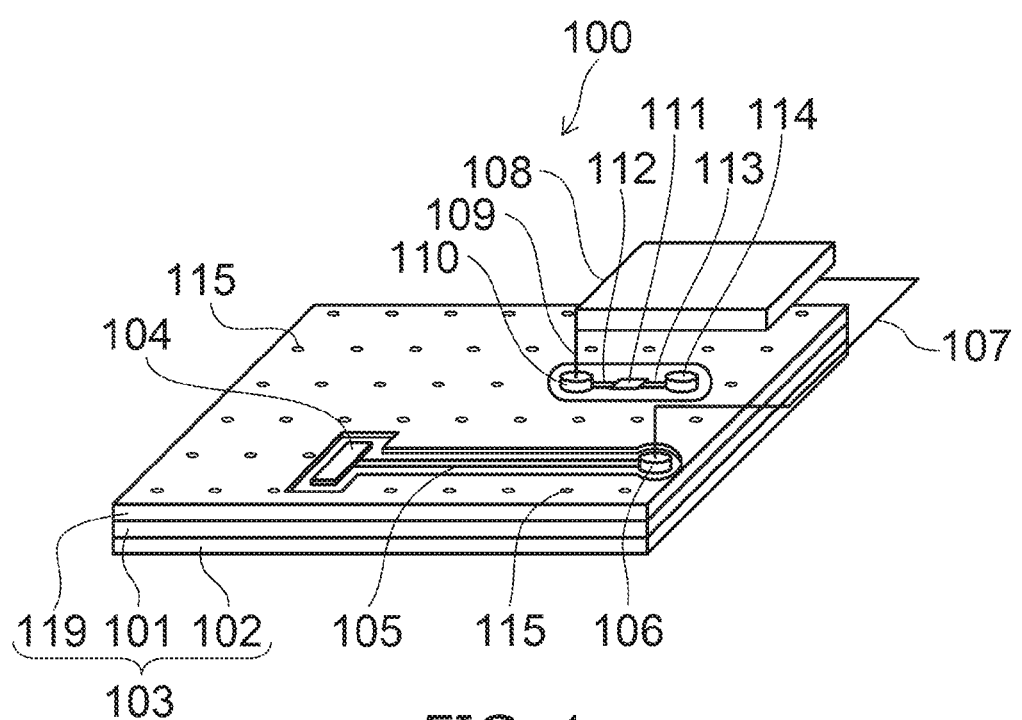
FIG. 1 is a perspective view illustrating a communication device according to the embodiment.

FIG. 1 is a perspective view illustrating a communication device according to the embodiment.

In the communication device 100 according to the embodiment as shown in FIG. 1, a substrate 103 is provided; and a communication circuit 104, a signal line 105, a terminal 106, a terminal 110, a capacitance element 111, a signal line 112, a signal line 113, a via 114, a signal line 109 connected to the terminal 110, a signal electrode 108 connected to the signal line 109, and a signal line 107 having one end connected to the terminal 106 and another end connected to the signal electrode 108 are provided on the substrate 103. The substrate 103 is formed from a ground unit 102, a dielectric plate 101 provided on the ground unit 102, and a ground unit 119 provided on the dielectric plate 101.

For example, the ground unit 102 is formed from a conductor such as copper, gold, etc.; and the reference potential of the communication device 100 is applied to the ground unit 102. The ground unit 119 is connected to the ground unit 102 by a via 115; and the same reference potential as the ground unit 102 is applied to the ground unit 119. The signal electrode 108 is connected to the capacitance element 111 via the signal line 109, the terminal 110, and the signal line 112. The capacitance element 111 is connected to the ground unit 102 via the signal line 113 and the via 114.

Figure 2:
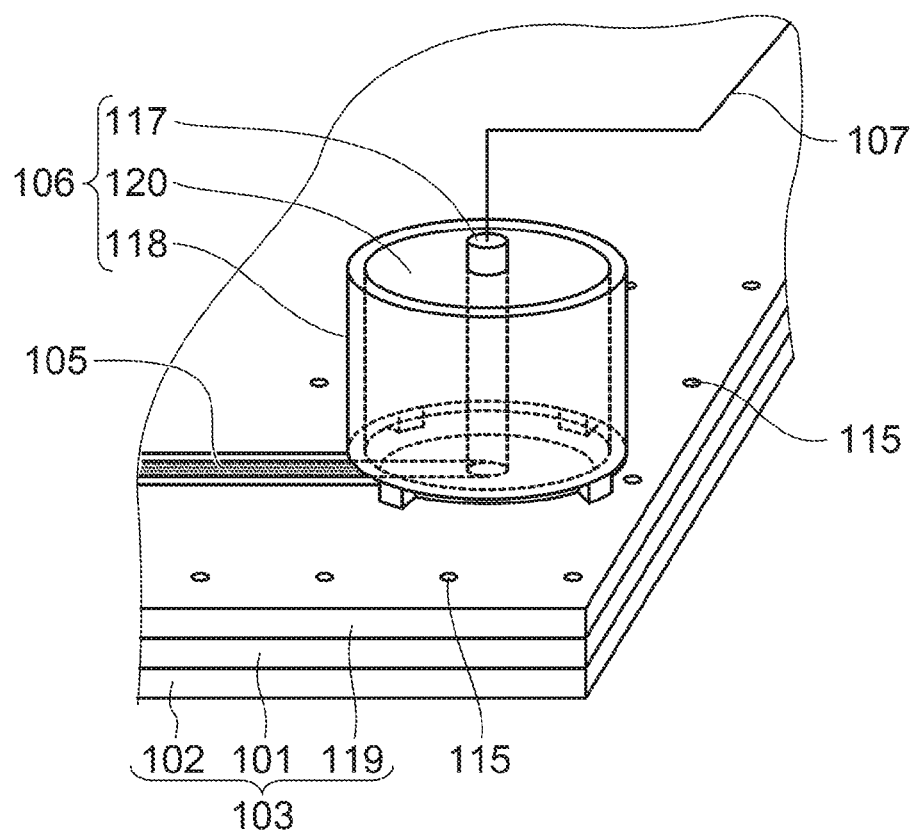
FIG. 2 is a perspective view illustrating terminals of the communication device according to the embodiment.

FIG. 2 is a perspective view illustrating terminals of the communication device according to the embodiment.

As shown in FIG. 2, the terminal 106 is formed of an outer conductor portion 118 connected to the ground unit 119, an inner conductor portion 117 connected to the signal line 105, and an insulator portion 120. The outer conductor portion 118 and the inner conductor portion 117 are electrically insulated by the insulator portion 120. The capacitance element 111 is, for example, a chip capacitor.

For example, the signal electrode 108 is formed of a conductive substance such as a transparent conductive material, conductive ink, a conductive sheet such as a copper foil or the like, an electrode used for medical care, etc. In the case where conductive ink is used as the conductive substance of the signal electrode 108, the signal electrode 108 can be formed easily on the inner side and outer side of the housing (not illustrated) of the communication device 100.

In the case where a transparent conductive material is used as the conductive substance of the signal electrode 108, for example, a display and an operation unit can be formed to overlap because the display content can be recognized.

The operation of the communication device according to the embodiment will now be described.

Figure 3:
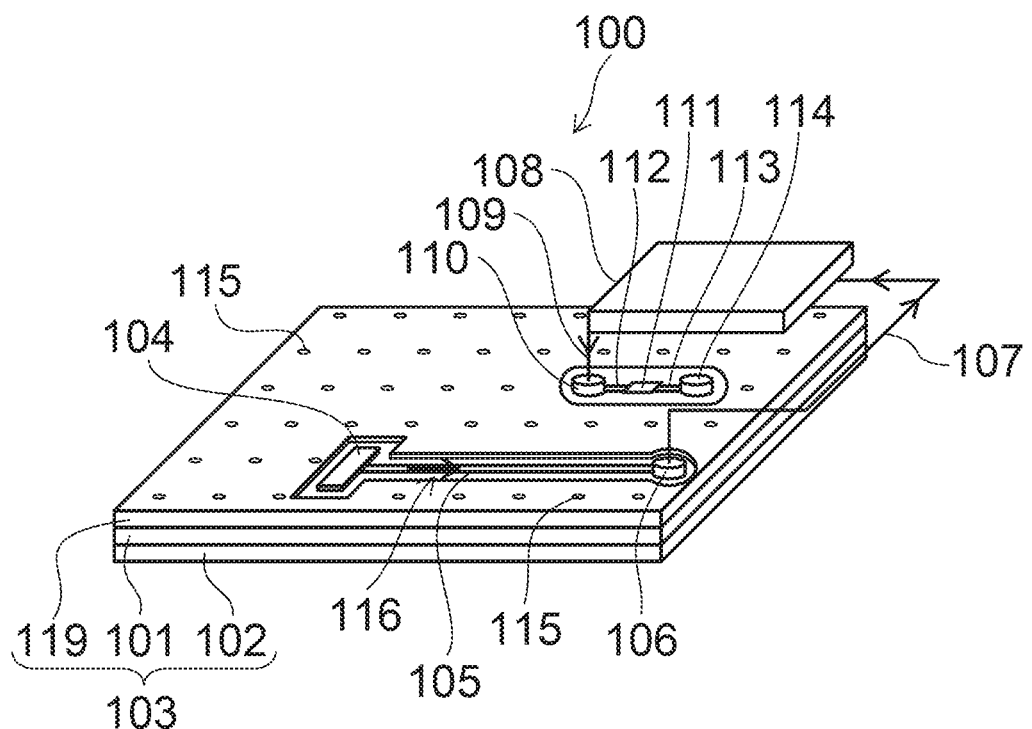
FIG. 3 is a drawing illustrating the operation of the communication device according to the embodiment.

FIG. 3 is a drawing illustrating the operation of the communication device according to the embodiment.

As shown in FIG. 3, a signal 116 that is transmitted from the communication circuit 104 of the communication device 100 is transmitted to the signal electrode 108 through the signal line 105, the inner conductor portion 117 of the terminal 106, and the signal line 107.

On the other hand, in a state that the signal electrode 108 is only connected to the signal line 107, the terminal 106, the signal line 107, and the signal electrode 108 are formed into a circuit having only a capacitance occurred between the signal electrode 108 and the ground unit 102. The capacitance value has the relationship that is inversely proportional to the distance between the signal electrode 108 and the ground unit 102. Therefore, the capacitance value increases as the distance between the signal electrode 108 and the ground unit 102 decreases. As a result, for the signal 116 transmitted from the terminal 106 to the signal electrode 108, the return loss is large; and communication is difficult.

Figure 4:
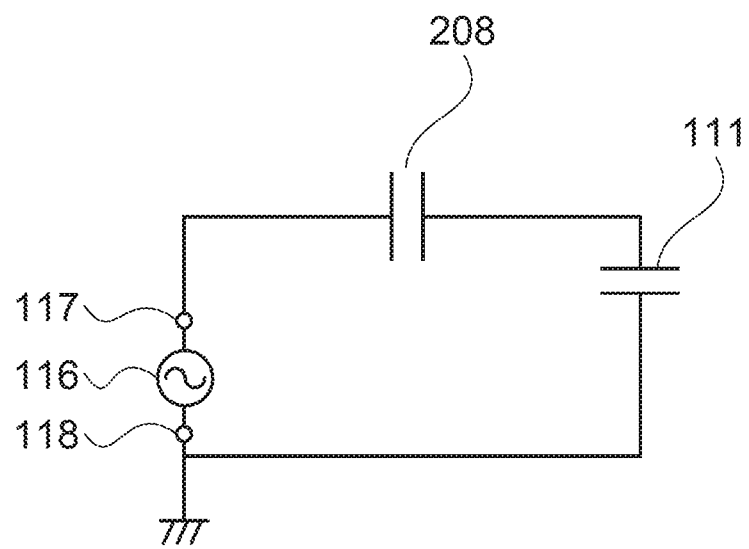
FIG. 4 is an equivalent circuit diagram illustrating the operation of the communication device according to the embodiment.

FIG. 4 is an equivalent circuit diagram illustrating the operation of the communication device according to the embodiment.

As shown in FIG. 4, the equivalent circuit of the communication device according to the embodiment is a circuit in which a capacitance 208 formed of the signal electrode 108 and the ground unit 102 is connected in series with the capacitance element 111. A combined capacitance value C1 is represented by Formula 1 recited below, where Ce is the capacitance value of the capacitance 208, Cg is the capacitance value of the capacitance element 111, and C1 is the combined capacitance value of the capacitance 208 and the capacitance element 111.

$$C1 = \frac{Ce \times Cg}{Ce + Cg} = \frac{Cg}{1 + Cg/Ce} \quad \text{[Formula 1]}$$

Therefore, Formula 2 recited below is applied in Formula 1 recited above to reduce the effects of the capacitance value Ce.

$$Cg < Ce \quad \text{[Formula 2]}$$

Thereby, because the value of the ratio (Cg/Ce) is a value less than 1, the combined capacitance C1 can be set as the capacitance value Cg of the capacitance element 111 regardless of the capacitance value Ce of the capacitance 208 even if the capacitance value Ce is large; and the control of the combined capacitance C1 is easy.

Figure 5:
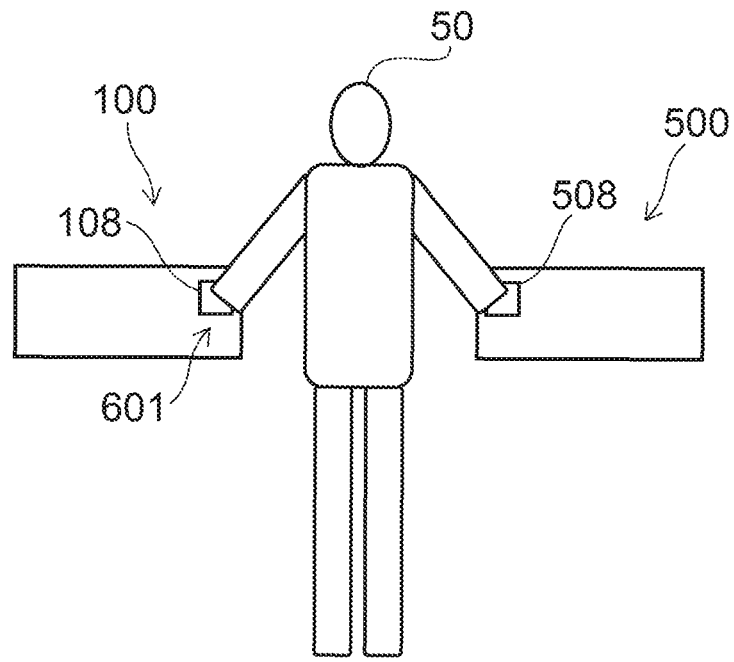
FIG. 5 is a drawing illustrating the state in which the communication device according to the embodiment communicates with another communication device via a human body.

FIG. 5 is a drawing illustrating the state in which the communication device according to the embodiment communicates with another communication device via a human body.

As shown in FIG. 5, the communication is performed by a human body 50 using a hand to touch the signal electrode 108 of the communication device 100 or by holding the hand over the signal electrode 108. Similarly, the communication is performed by the human body 50 using a hand to touch a signal electrode 508 of the communication device 500 or by holding the hand over the signal electrode 508. When the human body 50 uses the hand to touch the signal electrode 108 or holds the hand over the signal electrode 108, a capacitance 601 is formed between the signal electrode 108 and the ground unit 102 which has a reference potential.

Other than a hand, the location where the human body touches the communication device 100 may be, for example, a chest, an abdomen, a back, or a lower back.

Figure 6:
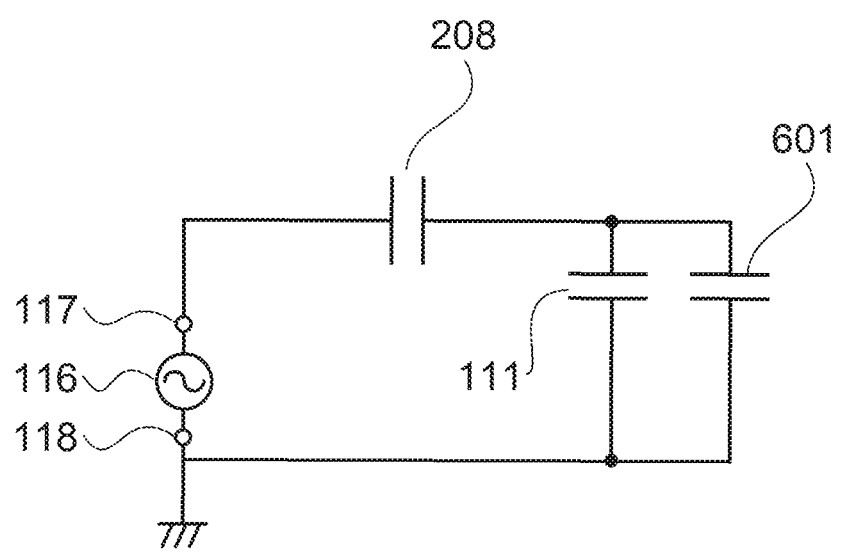
FIG. 6 is an equivalent circuit diagram illustrating the operation of the communication device according to the embodiment communicating via the human body.

FIG. 6 is an equivalent circuit diagram illustrating the operation of the communication device according to the embodiment communicating via the human body.

As shown in FIG. 6, the capacitance 601 that is formed via the human body is connected in parallel with the capacitance element 111. A combined capacitance value C2 is represented by Formula 3 recited below, where Ch is the capacitance value of the capacitance 601.

$$C2 = \frac{Ce \times (Cg + Ch)}{Ce + (Cg + Ch)} = \frac{(Cg + Ch)}{1 + (Cg + Ch)/Ce} \quad \text{[Formula 3]}$$

Formula 3 recited above is Formula 1 recited above in which Cg is replaced with (Cg+Ch). Because the capacitance value Ch changes according to the distance between the human body 50 and the signal electrode 108, the combined capacitance value C2 also changes according to the distance. Therefore, to reduce the effect of the capacitance value Ch, the inequality of Formula 4 recited below is applied in Formula 3 recited above.

$$Ch < Cg \quad \text{[Formula 4]}$$

Thereby, because the value of the ratio (Ch/Cg) is a value less than 1, the proportion of the change of the combined capacitance C2 with respect to the capacitance value Ch can be reduced. As a result, stable communication can be performed even when the human body 50 uses the hand to touch the signal electrode or holds the hand over the signal electrode.

Effects of the embodiment will now be described.

In the embodiment, Formula 2 recited above and Formula 4 recited above are applied. As a result, the relationship shown in Formula 5 recited below exists between the capacitance value Ch formed via the human body, the capacitance value Cg of the capacitance element 111, and the capacitance value Ce of the capacitance 208 formed of the signal electrode 108 and the ground unit 102.

$$Ch < Cg < Ce \quad \text{[Formula 5]}$$

By setting the capacitance value Cg of the capacitance element 111 to match Formula 5 recited above, the combined capacitance C2 of the communication device 100 can be set using the capacitance Cg of the capacitance element 111 regardless of the capacitance value Ce of the capacitance 208 formed of the signal electrode 108 and the ground unit 102. Also, the effects due to the human body 50 can be reduced. As a result, stable communication can be performed when the human body 50 touches the signal electrode 108 using a hand or when the human body 50 holds the hand over the signal electrode 108.

Figure 7:
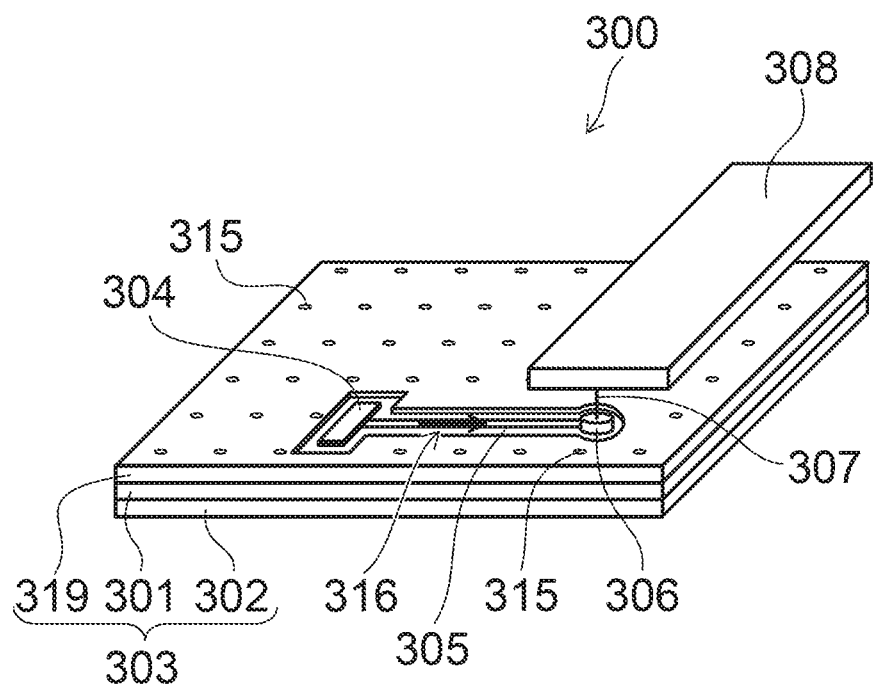
FIG. 7 is a perspective view illustrating a communication device according to a comparative example of the embodiment.

FIG. 7 is a perspective view illustrating a communication device according to a comparative example of the embodiment.

As shown in FIG. 7, compared to the communication device according to the embodiment (referring to FIG. 1), the communication device according to the comparative example differs in that the signal line 109, the terminal 110, the signal line 112, the capacitance element 111, the signal line 113, and the via 114 are not provided; and a signal 316 that is transmitted from a communication circuit 304 is connected directly to a signal electrode 308 via a signal line 305, a terminal 306, and a signal line 307.

Figure 8:
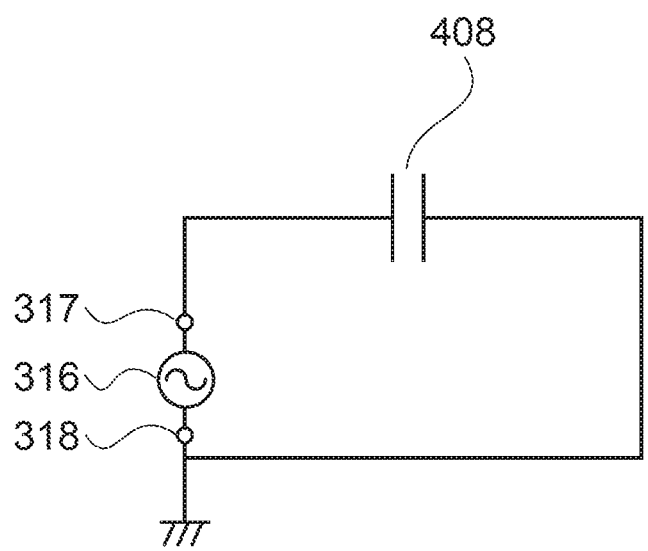
FIG. 8 is an equivalent circuit diagram illustrating the operation of the communication device according to the comparative example of the embodiment.

FIG. 8 is an equivalent circuit diagram illustrating the operation of the communication device according to the comparative example of the embodiment.

As shown in FIG. 8, the equivalent circuit is a circuit of only a capacitance 408 formed between the signal electrode 308 and a ground unit 302. The value of the capacitance 408 has a relationship that is inversely proportional to the distance between the signal electrode 308 and the ground unit 302. Therefore, for example, in the case where the communication device 300 is downsized, the capacitance value increases as the distance between the signal electrode 308 and the ground unit 302 decreases. As a result, the signal 316 that is transmitted from the communication circuit 304 to the signal electrode 308 is reflected; and the communication is difficult.

Figure 9:
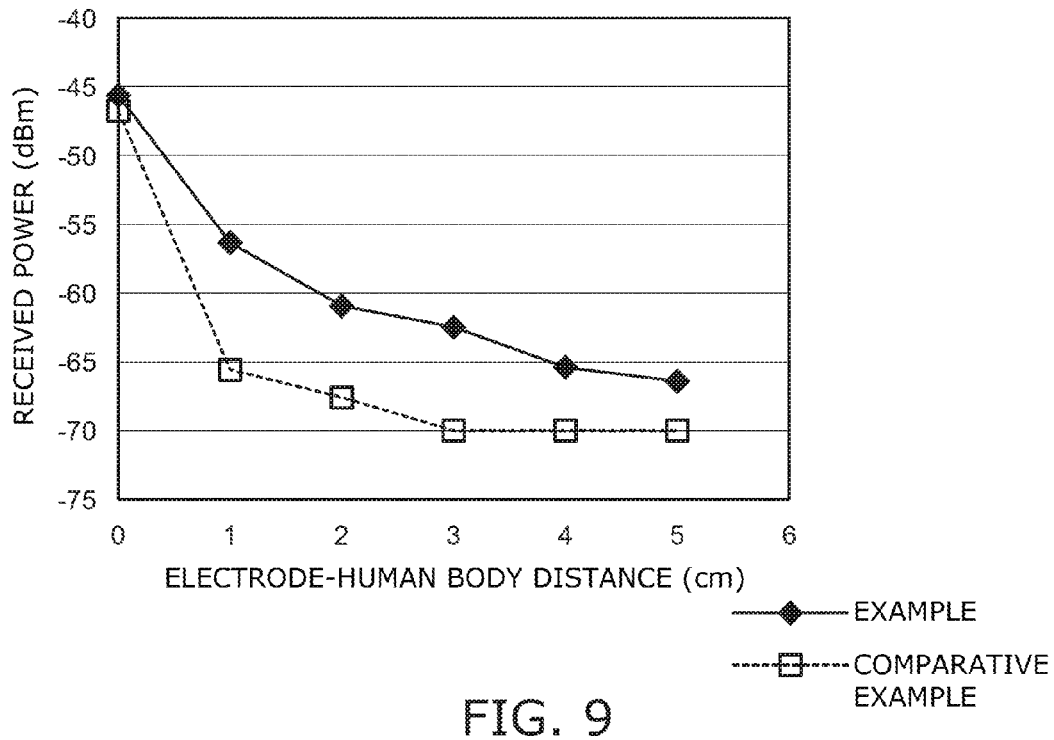
FIG. 9 is a graph illustrating the received power for the communication device according to the embodiment and the communication device according to the comparative example.

FIG. 9 is a graph illustrating the received power for the communication device according to the embodiment and the communication device according to the comparative example, in which the horizontal axis is the distance between the signal electrode and the human body, and the vertical axis is the received power.

In the communication device according to the embodiment as shown in FIG. 9, the combined capacitance C2 of the communication device 100 can be set using the capacitance Cg of the capacitance element 111; and the effects due to the human body 50 can be reduced. As a result, compared to the communication device according to the comparative example, the received power is high; and stable communication can be performed.

A first modification of the first embodiment will now be described.

Figure 10:
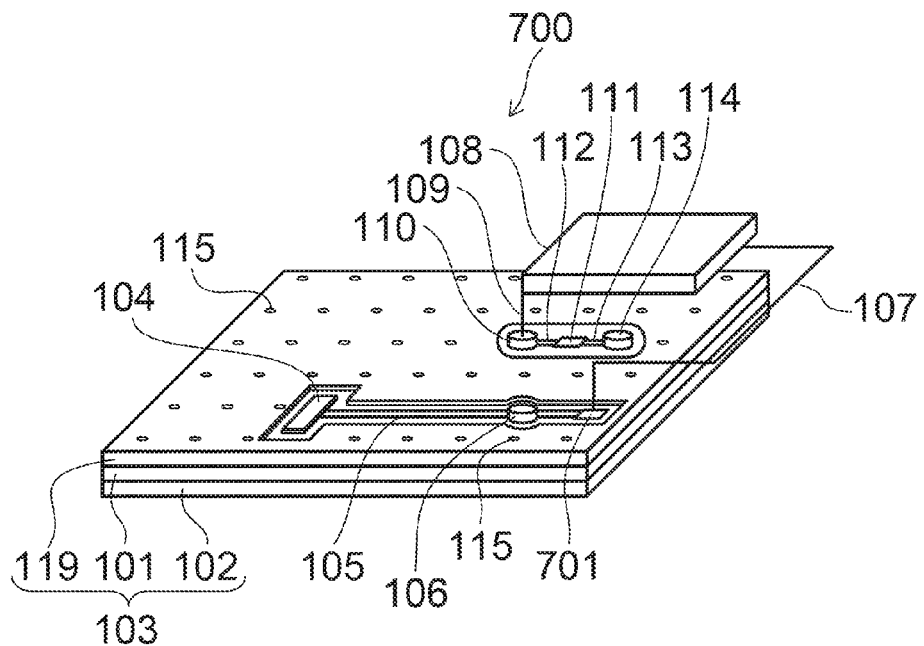
FIG. 10 is a perspective view illustrating the communication device according to the modification.

FIG. 10 is a perspective view illustrating the communication device according to the modification.

As shown in FIG. 10, compared to the communication device according to the first embodiment (referring to FIG. 1), the communication device according to the modification differs in that a chip inductor 701 is provided between the terminal 106 and the signal line 107.

For example, in the case where a large capacitance is necessary to satisfy Formula 5 recited above, it is difficult to downsize the device because the capacitance increases as the volume increases. In such a case, the capacitance value is reduced by the chip inductor 701 having an inductance component; impedance matching can be performed at the desired frequency using a capacitance element having a small volume; and downsizing of the device is possible.

Otherwise, the configuration, the operations, and the effects of the modification are similar to those of the first embodiment described above.

A second modification of the first embodiment will now be described.

Figure 11:
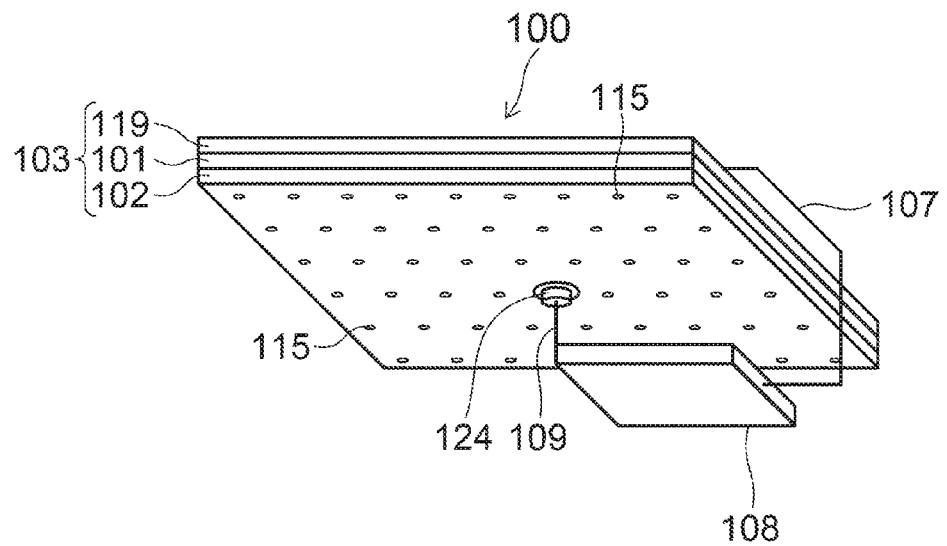
FIG. 11 is a perspective view illustrating a communication device according to the modification when viewed from below the device.

FIG. 11 is a perspective view illustrating a communication device according to the modification when viewed from below the device.

As shown in FIG. 11, compared to the communication device according to the first embodiment (referring to FIG. 1), the communication device according to the modification differs in that the signal electrode 108 is provided on the lower side of the ground unit 102. The signal electrode 108 that is provided on the lower side of the ground unit 102 is connected via the signal line 109 and a via 124 to the terminal 110 provided on the substrate 103.

Thus, the signal electrode 108 may be mounted at a location other than the upper side of the ground unit 102. For example, the signal electrode 108 may be mounted at the side surface of the substrate 103.

Otherwise, the configuration, the operations, and the effects of the modification are similar to those of the first embodiment described above.

A second embodiment will now be described.

Figure 12:
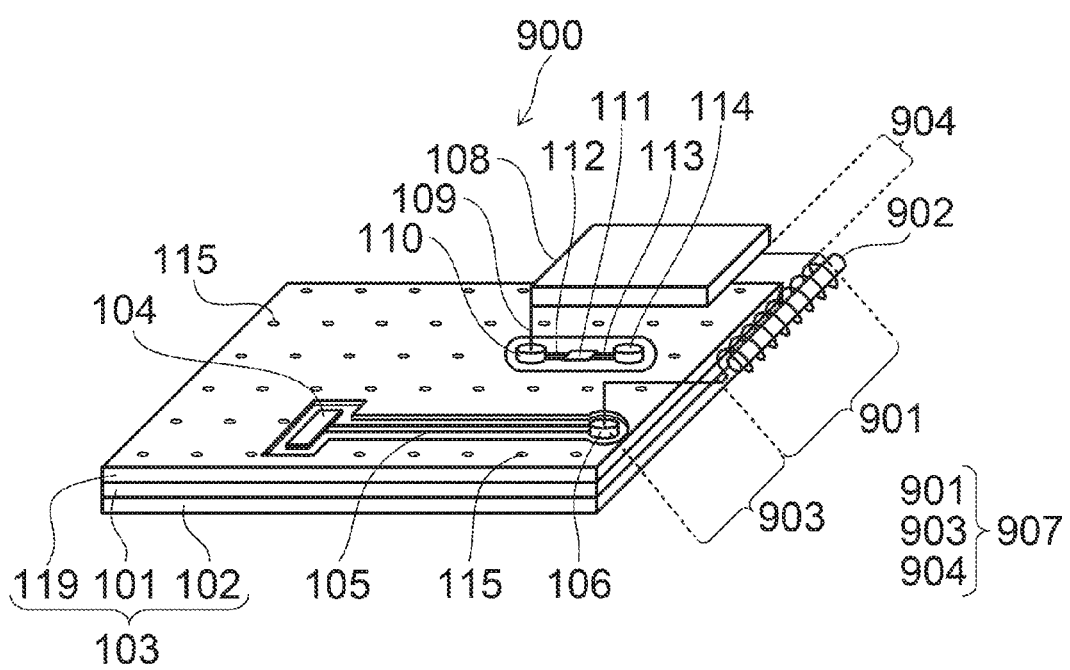
FIG. 12 is a perspective view illustrating a communication device according to the embodiment.

FIG. 12 is a perspective view illustrating a communication device according to the embodiment.

As shown in FIG. 12, compared to the communication device 100 according to the first embodiment described above (referring to FIG. 1), the communication device 900 according to the embodiment differs in that a signal line 907 is provided instead of the signal line 107.

The signal line 907 is formed of a winding portion 901, a signal line 903, and a signal line 904. A magnetic body 902 is provided at the center of the winding portion 901. The inductance component can be increased by providing the magnetic body 902.

Otherwise, the configuration of the embodiment is similar to that of the first embodiment described above.

The operation and the effects of the communication device according to the embodiment will now be described.

Compared to the communication device 100 according to the first embodiment described above, the impedance matching of the signal electrode 108 at the desired frequency can be performed easily in the communication device 900 according to the embodiment because the winding portion 901 has an inductance component. Specifically, the impedance matching can be performed by adjusting the capacitance component by modifying the capacitance element 111, and by adjusting the inductance component by modifying the number of winds of the winding portion 901 and the material of the magnetic body 902.

Compared to the communication device 100 according to the first embodiment described above, the communication device 900 according to the embodiment also can transmit and receive by generating a magnetic field at the human body periphery by the winding portion 901. As a result, stable transmitting and receiving are possible by the diversity effect between the signal electrode 108 and the winding portion 901.

Otherwise, the operations and the effects of the embodiment are similar to those of the first embodiment described above.

The winding portion 901 may be provided outside the ground unit 102 when viewed from above. Thereby, the effects from the ground unit 102 on the magnetic field generated by the winding portion 901 can be reduced.

A third embodiment will now be described.

Figure 13:
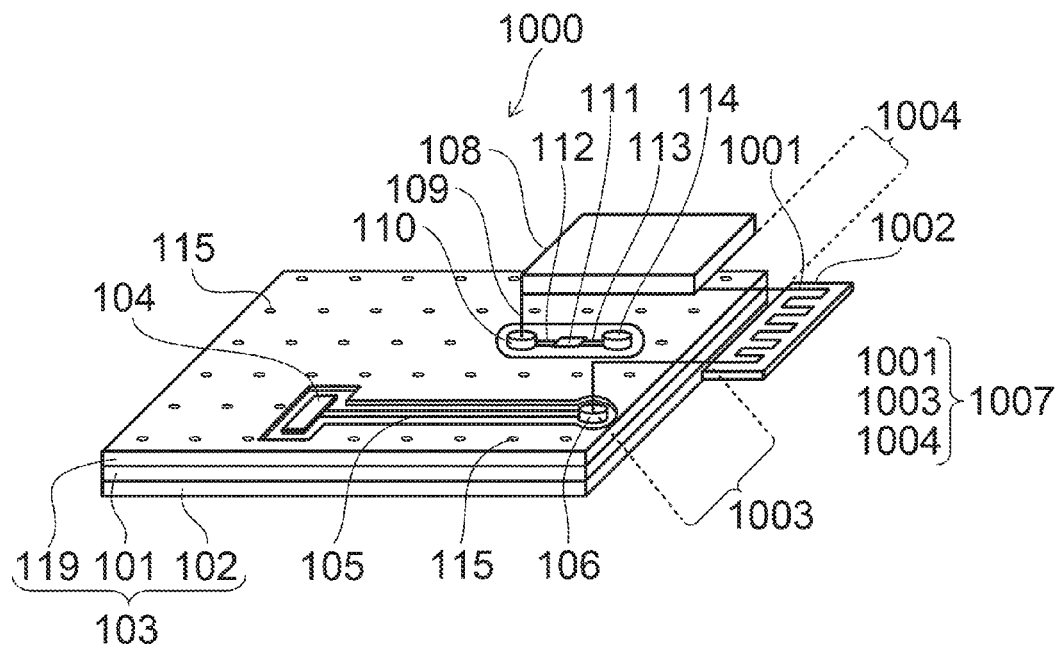
FIG. 13 is a perspective view illustrating a communication device according to the embodiment.

FIG. 13 is a perspective view illustrating a communication device according to the embodiment.

As shown in FIG. 13, compared to the communication device 900 according to the second embodiment described above (referring to FIG. 12), the communication device 1000 according to the embodiment differs in that a signal line 1007 is provided instead of the signal line 907.

The signal line 1007 is formed from a magnet portion 1002, a signal line 1004, a signal line 1003, and a meandering portion 1001 that is made of a conducting lead having a meandering configuration. The meandering portion 1001 is provided on the magnet portion 1002.

Otherwise, the configuration of the embodiment is similar to that of the second embodiment described above.

The operation and the effects of the communication device according to the embodiment will now be described.

Compared to the communication device 900 according to the second embodiment described above, mounting is easy for the communication device 1000 according to the embodiment because the inductance component is formed of the meandering portion 1001 which has a planar structure.

Also, the length of the meandering portion 1001 can be shorter because the meandering portion 1001 is provided on the magnet portion 1002.

By using, for example, a bendable magnet sheet as the magnet portion 1002, the magnet portion 1002 can be adhered to the inner side of the housing (not illustrated) of the communication device 1000, etc.

Otherwise, the operations and the effects of the embodiment are similar to those of the second embodiment described above.

A fourth embodiment will now be described.

Figure 14:
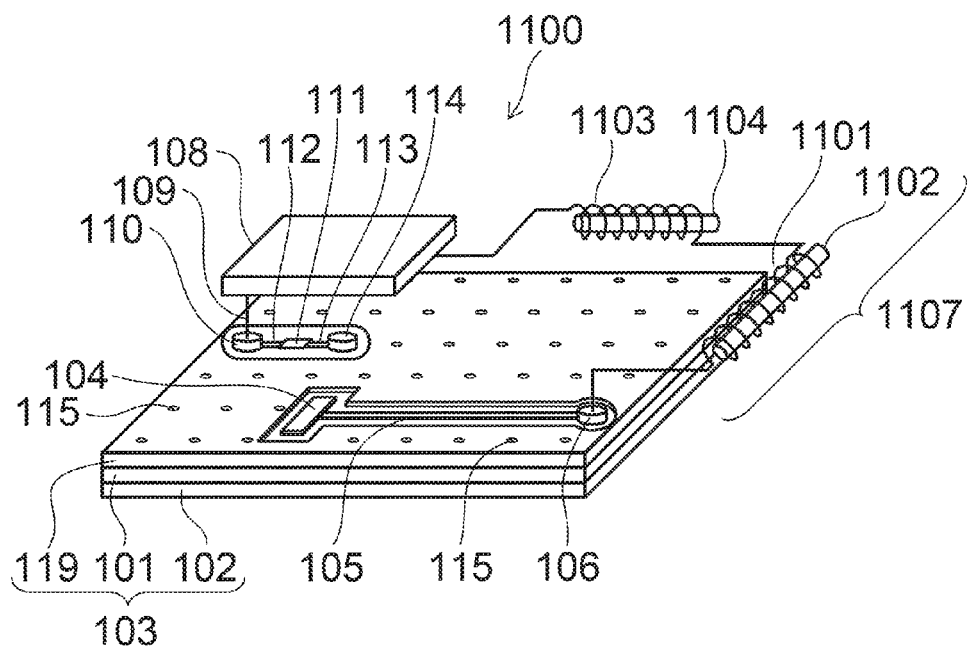
FIG. 14 is a perspective view illustrating a communication device according to the embodiment.

FIG. 14 is a perspective view illustrating a communication device according to the embodiment.

In the communication device 1100 according to the embodiment as shown in FIG. 14, compared to the communication device 900 according to the second embodiment described above (referring to FIG. 12), a winding portion 1101 and a winding portion 1103 are provided along a signal line 1107; and the central axis of the winding portion 1101 and the central axis of the winding portion 1103 are orthogonal to each other. A magnetic body 1102 is provided at the center of the winding portion 1101; a magnetic body 1104 is provided at the center of the winding portion 1103; and the inductance component can be increased.

Otherwise, the configuration of the embodiment is similar to that of the second embodiment described above.

The operation and the effects of the communication device according to the embodiment will now be described.

Compared to the communication device 900 according to the second embodiment described above, stable transmitting and receiving are possible for the communication device 1100 according to the embodiment due to the diversity effect for the magnetic field because the central axis of the winding portion 1101 and the central axis of the winding portion 1103 are orthogonal to each other.

Otherwise, the operations and the effects of the embodiment are similar to those of the second embodiment described above.

A fifth embodiment will now be described.

Figure 15:
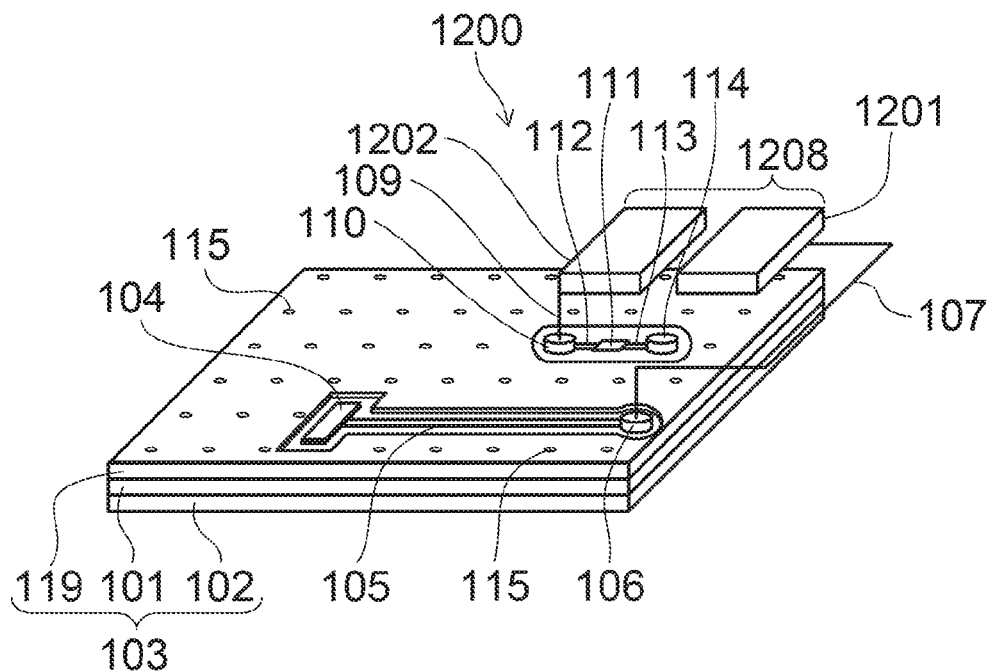
FIG. 15 is a perspective view illustrating a communication device according to the embodiment.

FIG. 15 is a perspective view illustrating a communication device according to the embodiment.

As shown in FIG. 15, compared to the communication device 100 according to the first embodiment described above (referring to FIG. 1), the communication device 1200 according to the embodiment differs in that instead of the signal electrode 108, a signal electrode 1208 is provided and is formed of the two electrodes of a signal electrode 1201 and a signal electrode 1202 that are separated but proximal enough to form a capacitance.

Otherwise, the configuration of the embodiment is similar to that of the first embodiment described above.

The operation and the effects of the communication device according to the embodiment will now be described.

The communication device 1200 according to the embodiment is a circuit in which a capacitance Cd is formed between the signal electrode 1201 and the signal electrode 1202; and the capacitance Cd is connected in series. Accordingly, compared to the communication device 100 according to the first embodiment described above, the capacitance of the signal electrode 1208 can be reduced because a new capacitance Cd is added. As a result, the return loss of the signal electrode 1208 can be reduced; and stable communication is possible.

Otherwise, the operations and the effects of the embodiment are similar to those of the second embodiment described above.

A sixth embodiment will now be described.

Compared to the communication device 100 according to the first embodiment described above, the communication device according to the embodiment differs in that a total length L of the signal line 107 and the signal electrode 108 is less than 0.25 times the wavelength of the communication signal.

Otherwise, the configuration of the embodiment is similar to that of the first embodiment described above.

The operation and the effects of the communication device according to the embodiment will now be described.

In the case where the total length L is a length of 0.25 times the wavelength of the communication signal, the signal line 107 and the signal electrode 108 become a ¼ wavelength monopole antenna, radiate an electromagnetic wave, and undesirably perform communication regardless of the existence or absence of the human body. Accordingly, by setting the total length L to be less than 0.25 times the wavelength of the communication signal, stable transmitting and receiving are possible when the human body contacts or is proximal to the signal electrode.

Otherwise, the operations and the effects of the embodiment are similar to those of the first embodiment described above.

A seventh embodiment will now be described.

Figure 16:
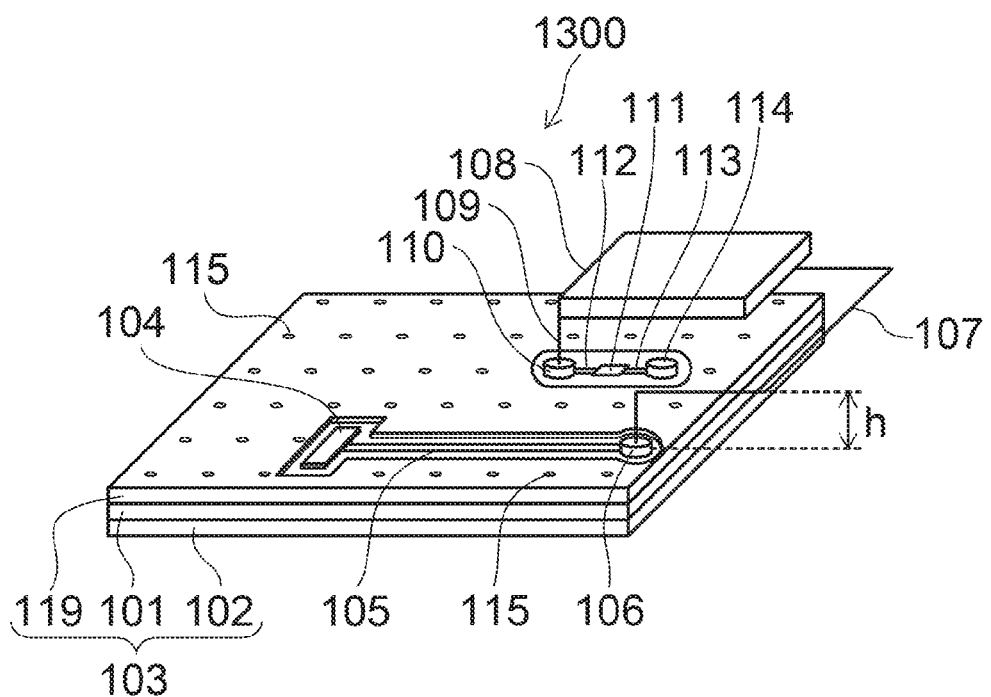
FIG. 16 is a perspective view illustrating a communication device according to the embodiment.

FIG. 16 is a perspective view illustrating a communication device according to the embodiment.

In the communication device 1300 according to the embodiment as shown in FIG. 16, compared to the communication device 100 according to the first embodiment described above (referring to FIG. 1), a distance h between the signal line 107 and the dielectric plate 101 is not more than 0.15 times the wavelength of the communication signal.

Otherwise, the configuration of the embodiment is similar to that of the first embodiment described above.

The operation and the effects of the communication device according to the embodiment will now be described.

Figure 17:
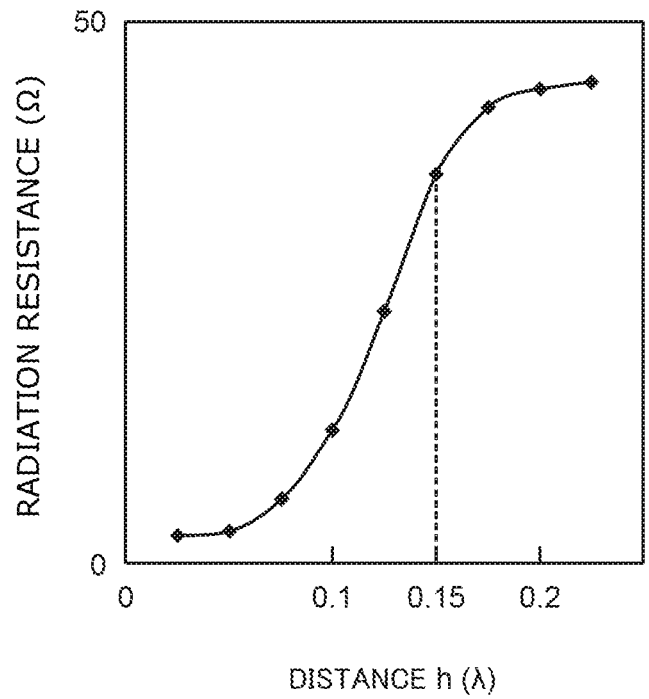
FIG. 17 is a graph illustrating the radiation resistance of the communication device according to the seventh embodiment.

FIG. 17 is a graph illustrating the radiation resistance of the communication device according to the seventh embodiment, in which the horizontal axis is the distance h between the signal line and the dielectric plate, and the vertical axis is the radiation resistance.

As shown in FIG. 17, when the distance h is not more than 0.15 times the wavelength of the communication signal, the radiation resistance decreases abruptly; and the radiation amount of the electromagnetic wave decreases. Accordingly, by setting the distance h to be not more than 0.15 times the wavelength of the communication signal, stable transmitting and receiving are possible when the human body contacts or is proximal to the signal electrode.

Otherwise, the operations and the effects of the embodiment are similar to those of the first embodiment described above.

An eighth embodiment will now be described.

The configuration of a communication device according to the embodiment will now be described.

Figure 18:
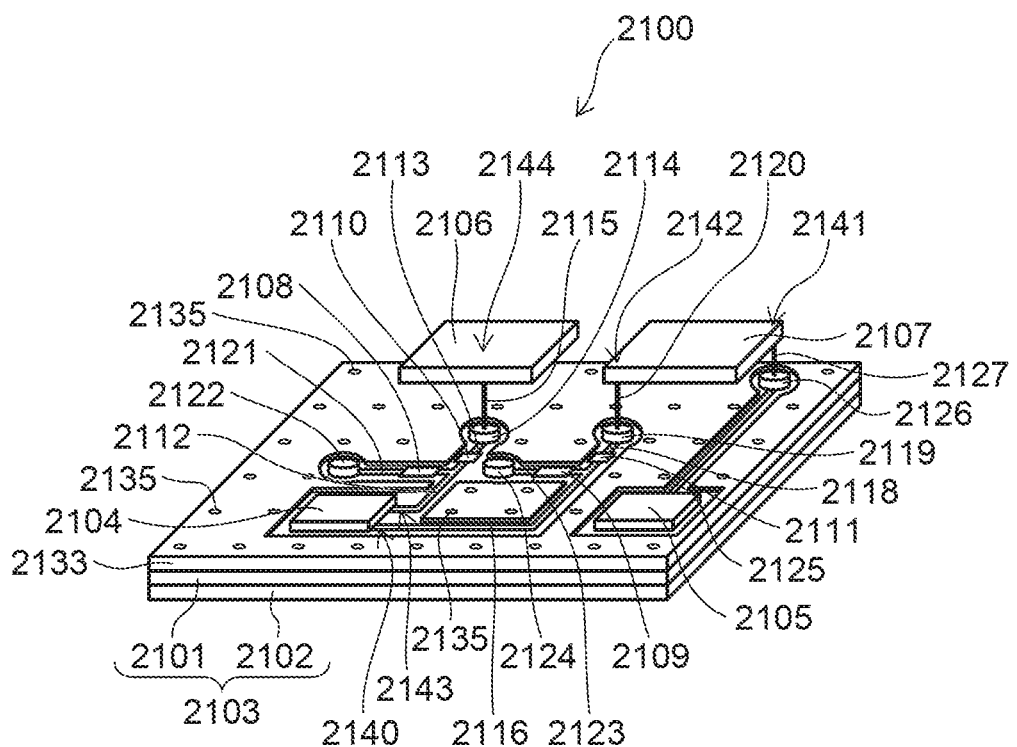
FIG. 18 is a perspective view illustrating the communication device according to the embodiment.

FIG. 18 is a perspective view illustrating the communication device according to the embodiment.

As shown in FIG. 18, compared to the communication device 100 according to the first embodiment described above, the communication device 2100 (the biological signal monitoring device) according to the embodiment differs in that a resistance element 2111, a biological signal sensor 2104, a signal electrode 2106, a signal line 2115, a signal line 2116, a terminal 2114, a signal line 2113, a resistance element 2110, a signal line 2112, a capacitance element 2108, a signal line 2121, and a via 2122 are additionally provided.

A connection position 2142 between a signal line 2120 and a signal electrode 2107 exists on the lower surface of the signal electrode 2107. A connection position 2141 between a signal line 2127 and the signal electrode 2107 exists on the lower surface of the signal electrode 2107. The connection position 2142 and the connection position 2141 are mutually-different positions.

The biological signal sensor 2104, the resistance element 2111, and a capacitance element 2109 are provided on a substrate 2103. The signal line 2116 that branches into three is provided on the substrate 2103 and connected to the resistance element 2111, the capacitance element 2109, and an input terminal 2140 of the biological signal sensor 2104.

The terminal 2114, the resistance element 2110, and the signal line 2113 that connects the resistance element 2110 and the terminal 2114 are provided on the substrate 2103. The signal electrode 2106 is provided to be separated from the signal electrode 2107 and the substrate 2103 above the substrate 2103; and the signal electrode 2106 and the terminal 2114 are connected at a connection position 2144 by the signal line 2115.

The capacitance element 2108, the signal line 2112 that connects the resistance element 2110, the capacitance element 2108, and an input terminal 2143 of the biological signal sensor 2104, and the signal line 2121 that connects the capacitance element 2108 and the via 2122 are provided on the substrate 2103.

The substrate 2103 is formed from a ground unit 2102, a dielectric plate 2101 that is provided on the ground unit 2102, and a ground unit 2133 that is provided on the dielectric plate 2101. For example, the ground unit 2102 is formed from a conductor such as copper (Cu), gold (Au), etc.; and the reference potential of the communication device 2100 is applied to the ground unit 2102. The ground unit 2133 is connected to the ground unit 2102 by a via 2135 and has the same reference potential as the ground unit 2102. The vias 2122 and 2124 are connected to the ground unit 2102.

It is desirable for the connection position 2141 where the signal electrode 2107 and a communication circuit 2105 are connected and the connection position 2142 where the signal electrode 2107 and the capacitance element 2109 are connected via the resistance element 2111 to exist on a line segment on the surface of the signal electrode 2107 including the connection position 2141 and the connection position 2142, where the line segment includes two points arbitrarily selected to maximize the length between the two points.

For example, in the case where the configuration of the signal electrode 2107 is quadrilateral when viewed from above, the connection position 2141 and the connection position 2142 exist on the diagonal line of the signal electrode 2107.

The signal electrodes 2106 and 2107 are used for medical care or for health equipment. For example, a biological signal that is generated by the human body is input to the signal electrode 2107 and received by the biological signal sensor 2104 by the human using a hand to touch the signal electrode 2107 or by holding the hand over the signal electrode 2107. The signal electrode 2107 is used also as the signal electrode of a human body communication signal 2136.

The biological signal refers to a signal of physiological information generated by the activity of the human body and can be received by a sensor, etc. A heart rate, a muscle potential, etc., are examples.

The human body communication signal refers to a signal generated by a communication device and communicated from the communication device to another communication device via the human body.

The circuit that includes the signal electrode 2106, the resistance element 2110, and the capacitance element 2108 is called a biological signal circuit.

Otherwise, the configuration of the embodiment is similar to that of the first embodiment described above.

The operation of the communication device according to the embodiment will now be described.

Figure 19:
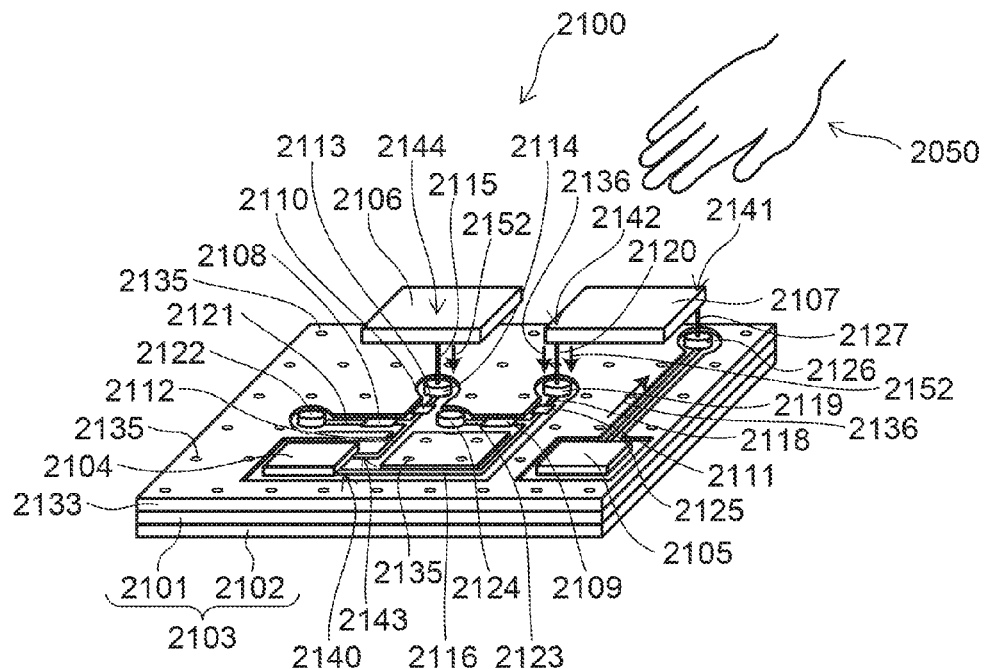
FIG. 19 is a drawing illustrating the operation of the communication device according to the embodiment.

FIG. 19 is a drawing illustrating the operation of the communication device according to the embodiment.

Figure 20:
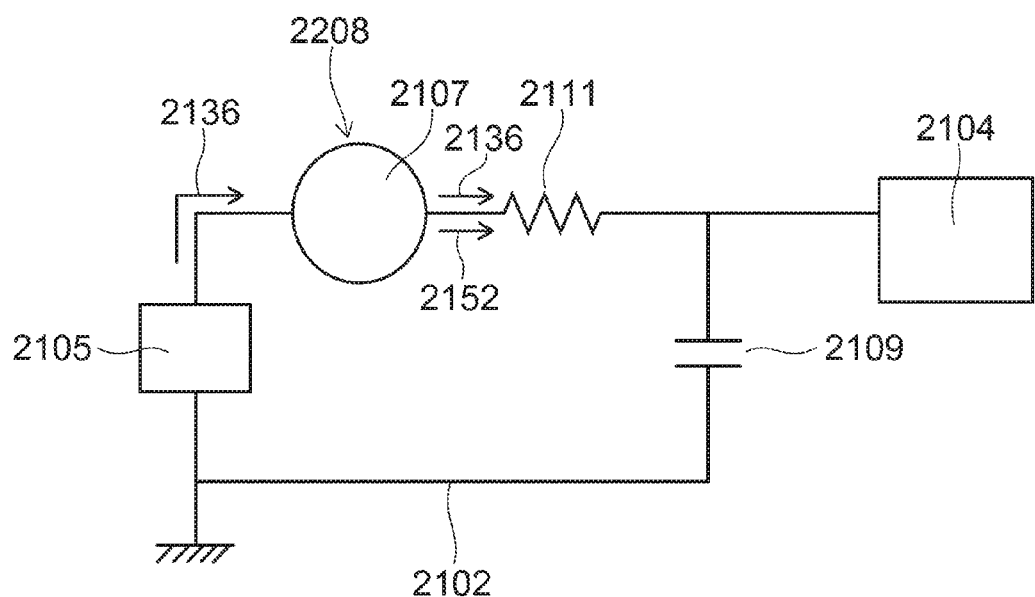
FIG. 20 is a circuit diagram illustrating the operation of the communication device according to the embodiment.

FIG. 20 is a circuit diagram illustrating the operation of the communication device according to the embodiment. However, in FIG. 20, only the communication circuit 2105, the signal electrode 2107, the resistance element 2111, the capacitance element 2109, and the biological signal sensor 2104 are shown; and the other constituents are not illustrated.

As shown in FIG. 19 and FIG. 20, compared to the first embodiment described above, the communication device 2100 according to the embodiment differs in that a biological signal 2152 that is generated by the human body is input to the signal electrode 2107 by the human using a hand to touch the signal electrode 2107 or by holding the hand over the signal electrode 2107; and the biological signal 2152 is transmitted to the biological signal sensor 2104. This will now be described in detail.

As shown in FIG. 19 and FIG. 20, the human body communication signal 2136 that is transmitted from the communication circuit 2105 is transmitted to the signal electrode 2107 through a signal line 2125, a terminal 2126, and the signal line 2127. Subsequently, the human body communication signal 2136 is transmitted to the biological signal sensor 2104 through the signal line 2120, a terminal 2119, a signal line 2118, the resistance element 2111, and the signal line 2116. The human body communication signal 2136 branches in the signal line 2116 and is transmitted also to the ground unit 2102 through the capacitance element 2109, a signal line 2123, and the via 2124.

The biological signal 2152 that is generated by a human body 2050 is input to the signal electrode 2107 by the human body 2050 using a hand to touch the signal electrode 2107 or by holding the hand over the signal electrode 2107; and the biological signal 2152 is transmitted to the biological signal sensor 2104 through the signal line 2120, the terminal 2119, the signal line 2118, the resistance element 2111, and the signal line 2116. The biological signal 2152 branches in the signal line 2116 and is transmitted also to the ground unit 2102 through the capacitance element 2109, the signal line 2123, and the via 2124.

The biological signal 2152 is input also to the signal electrode 2106 by the human body 2050 using the hand to touch the signal electrode 2106 or by holding the hand over the signal electrode 2106; and the biological signal 2152 is transmitted to the biological signal sensor 2104 through the signal line 2115, the terminal 2114, the signal line 2113, the resistance element 2110, and the signal line 2112. The biological signal 2152 branches in the signal line 2112 and is transmitted to the ground unit 2102 through the capacitance element 2108, the signal line 2121, and the via 2122.

A capacitance 2208 is formed between the ground unit 2102 and the signal electrode 2107 shown in FIG. 20. The capacitance 2208 is connected in series with the capacitance element 2109. Similarly to the first embodiment described above, the combined capacitance value C1 can be set as the capacitance value Cg of the capacitance element 2109 regardless of the capacitance value Ce by applying Formula 2 recited above in Formula 1 recited above, where Ce is the capacitance value of the capacitance 2208, Cg is the capacitance value of the capacitance element 2109, and C1 is the combined capacitance value of the capacitance 2208 and the capacitance element 2109.

Similarly to the communication device 100 according to the first embodiment shown in FIG. 5, in the communication device 2100 according to the embodiment, a capacitance 2160 that is formed via the human body by the human body 2050 using a hand to touch the signal electrode or by holding the hand over the signal electrode is connected in parallel with the capacitance element 2109 shown in FIG. 20.

Figure 21:
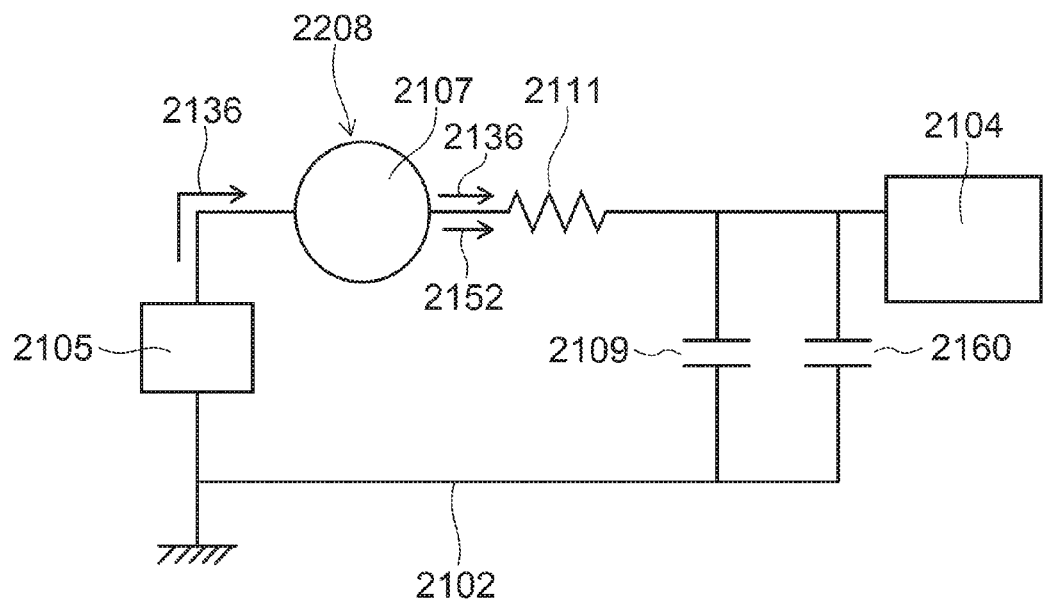
FIG. 21 is a circuit diagram illustrating the operation of the communication device according to the embodiment.

FIG. 21 is a circuit diagram illustrating the operation of the communication device according to the embodiment. Compared to FIG. 20, the capacitance 2160 that is formed via the human body by the human body 2050 using a hand to touch the signal electrode or by holding the hand over the signal electrode is added. Similarly to the first embodiment described above, by applying Formula 4 recited above in Formula 3 recited above, where Ch is the capacitance value of the capacitance 2160 and C2 is the combined capacitance value of the capacitance value Ch, the capacitance value Ce, and the capacitance value Cg, the change of the impedance of the signal electrode 2107 can be reduced; and stable communication can be performed even if the contact state between the human body 2050 and the signal electrode 2107 is unstable.

Figure 22:
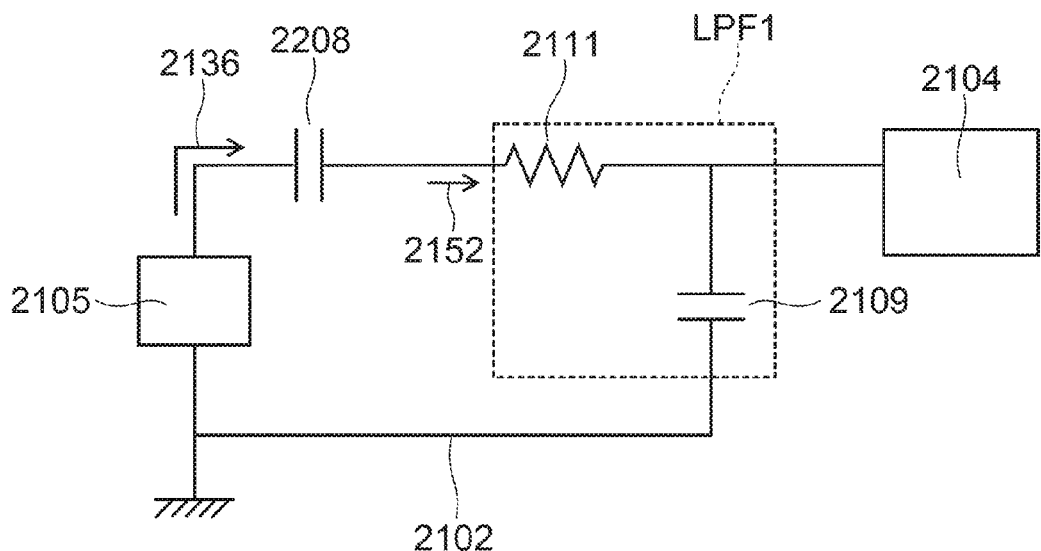
FIG. 22 is an equivalent circuit diagram illustrating the operation of the communication device according to the embodiment.

FIG. 22 is an equivalent circuit diagram illustrating the operation of the communication device according to the embodiment.

Compared to FIG. 20 described above, FIG. 22 differs in that the signal electrode 2107 is shown as the capacitance 2208 formed between the signal electrode 2107 and the ground unit 2102.

As shown in FIG. 22, a low-pass filter LPF1 is formed of the resistance element 2111 and the capacitance element 2109. Accordingly, by setting a frequency fs of the human body communication signal 2136 used in the communication circuit 2105 to be higher than a frequency fh of the biological signal 2152, the human body communication signal 2136 is suppressed by the low-pass filter LPF1; and the biological signal 2152 is transmitted to the biological signal sensor 2104. As a result, the sensitivity of the biological signal sensor 2104 improves.

For example, in the case where electrocardio activity is used as the biological signal 2152, because the frequency fh is about 100 Hz, it is sufficient for the frequency fs of the human body communication signal 2136 used in the communication circuit 2105 to be higher than about 100 Hz.

Figure 23:
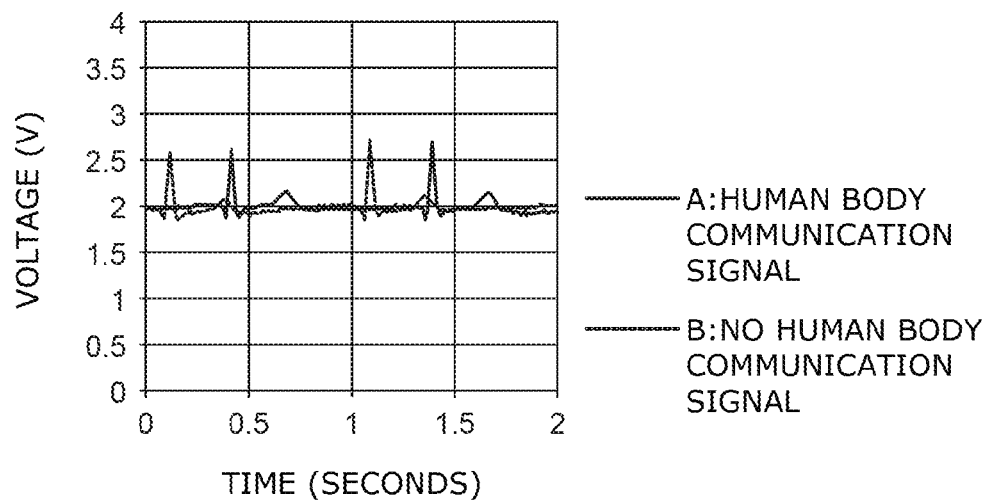
FIG. 23 is a graph of when the human body communication signal is ON or OFF.

FIG. 23 is a graph of when the human body communication signal is ON or OFF, in which the horizontal axis is time, and the vertical axis is the output voltage of the biological signal sensor. However, this is the case where the frequency fs of the human body communication signal 2136 is set to be higher than the frequency fh of the biological signal 2152.

As shown in FIG. 23, in the case where the human body communication signal 2136 from the communication circuit 2105 is not input to the signal electrode 2107, the biological signal 2152 can be measured as in graph B of FIG. 23. Even in the case where the human body communication signal 2136 is input to the signal electrode 2107, the biological signal 2152 can be measured as in graph A of FIG. 23. In other words, the biological signal 2152 can be measured without being affected by the existence or absence of the human body communication signal 2136.

This is because the human body communication signal 2136 is suppressed by the low-pass filter LPF1; and after passing through the low-pass filter LPF1, the biological signal 2152 is transmitted to the biological signal sensor 2104.

Otherwise, the operation of the embodiment is similar to that of the first embodiment described above.

Effects of the embodiment will now be described.

In the communication device 2100 according to the embodiment, the low-pass filter LPF1 is formed of the resistance element 2111 and the capacitance element 2109. By setting the frequency fs of the human body communication signal 2136 to be higher than the frequency fh of the biological signal 2152, the human body communication signal 2136 is suppressed by the low-pass filter LPF1; and the biological signal 2152 is transmitted to the biological signal sensor 2104. As a result, the sensitivity of the biological signal sensor 2104 improves.

As a result, as shown in FIG. 23, the biological signal 2152 can be measured by the biological signal sensor 2104 without being affected by the existence or absence of the human body communication signal 2136.

Otherwise, the effects of the embodiment are similar to those of the first embodiment described above.

A comparative example of the embodiment will now be described.

Figure 24:
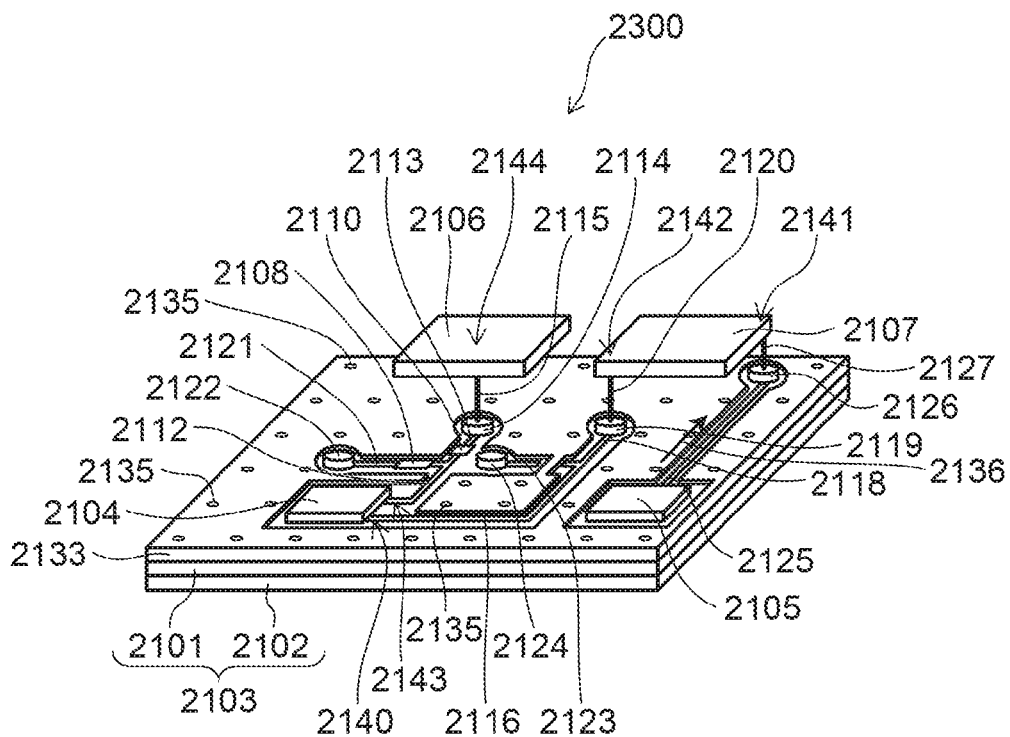
FIG. 24 is a perspective view illustrating a communication device according to the comparative example of the embodiment.

FIG. 24 is a perspective view illustrating a communication device according to the comparative example of the embodiment.

Compared to the communication device 2100 according to the embodiment (referring to FIG. 18), the communication device 2300 according to the comparative example differs in that the resistance element 2111 and the capacitance element 2109 are not mounted; and the signal line 2118 and the signal line 2116 are shorted.

Figure 25:
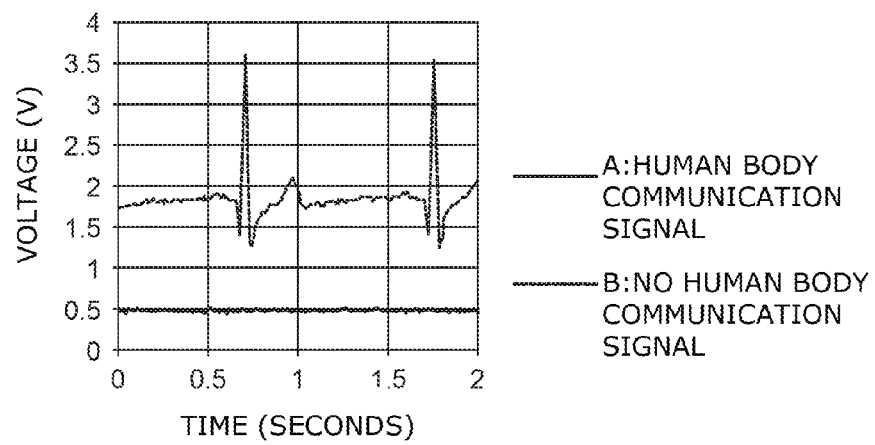
FIG. 25 is a graph of when the human body communication signal is ON or OFF.

FIG. 25 is a graph of when the human body communication signal is ON or OFF, in which the horizontal axis is time, and the vertical axis is the output voltage of the biological signal sensor.

As shown in FIG. 25, the biological signal 2152 can be measured as in graph D of FIG. 25 in the case where the human body communication signal 2136 from the communication circuit 2105 is not input to the signal electrode 2107. However, as in graph C of FIG. 25, the biological signal 2152 cannot be measured in the case where the human body communication signal 2136 from the communication circuit 2105 is input to the signal electrode 2107.

A first modification of the embodiment will now be described.

Figure 26:
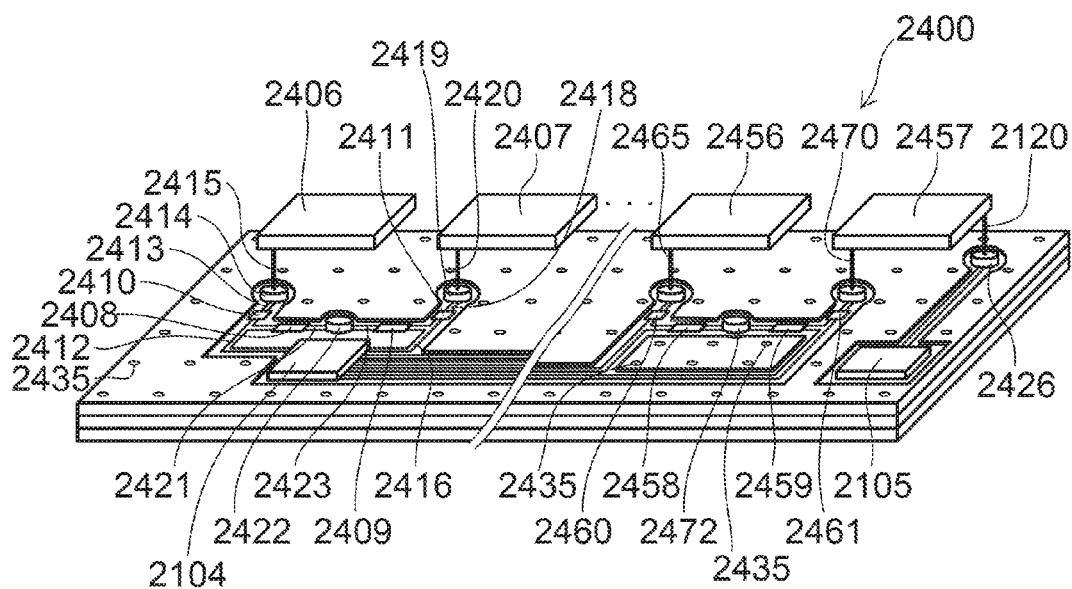
FIG. 26 is a perspective view illustrating a communication device according to the modification.

FIG. 26 is a perspective view illustrating a communication device according to the modification.

As shown in FIG. 26, compared to the communication device 2100 according to the first embodiment described above (referring to FIG. 18), the communication device 2400 according to the modification differs in that multiple signal electrodes such as a signal electrode 2456, a signal electrode 2457, etc., are added; and each of the signal electrodes is connected to the biological signal sensor 2104 via a low-pass filter made of a resistance element and a capacitance element. Thereby, the reception level of the biological signal sensor 2104 can be improved because the biological signal can be received from the multiple signal electrodes.

Otherwise, the configuration, the operations, and the effects of the modification are similar to those of the first embodiment described above.

A second modification of the embodiment will now be described.

Figure 27:
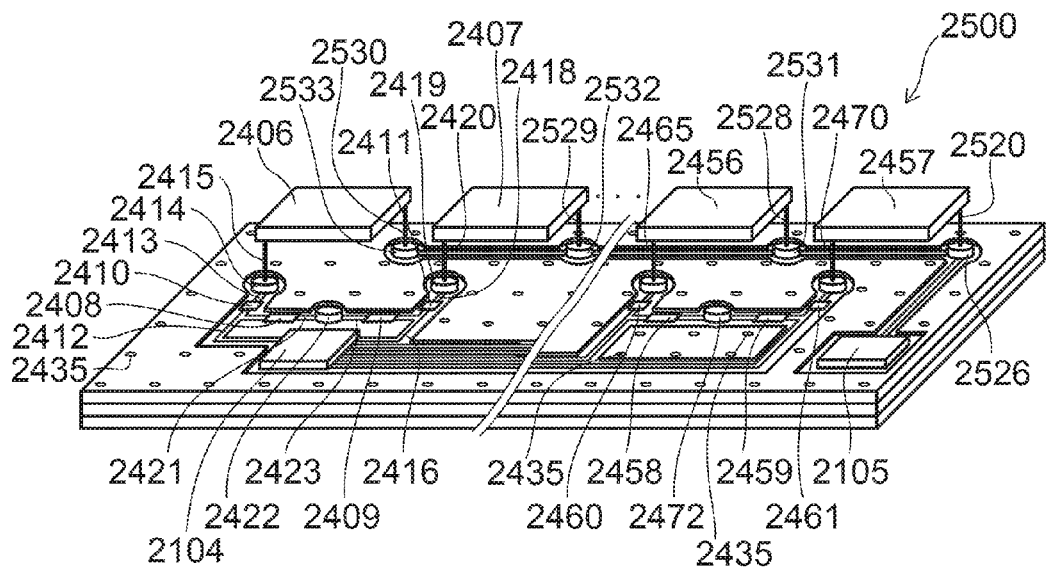
FIG. 27 is a perspective view illustrating a communication device according to the modification.

FIG. 27 is a perspective view illustrating a communication device according to the modification.

As shown in FIG. 27, compared to the communication device 2400 according to the first modification described above (referring to FIG. 26), the communication device 2500 according to the modification differs in that each of the multiple signal electrodes is connected to the communication circuit 2105. Thereby, the reception level of the communication circuit 2105 can be improved because the human body communication signal from the multiple signal electrodes can be received.

Otherwise, the configuration, the operations, and the effects of the modification are similar to those of the first modification described above.

A ninth embodiment will now be described.

Figure 28:
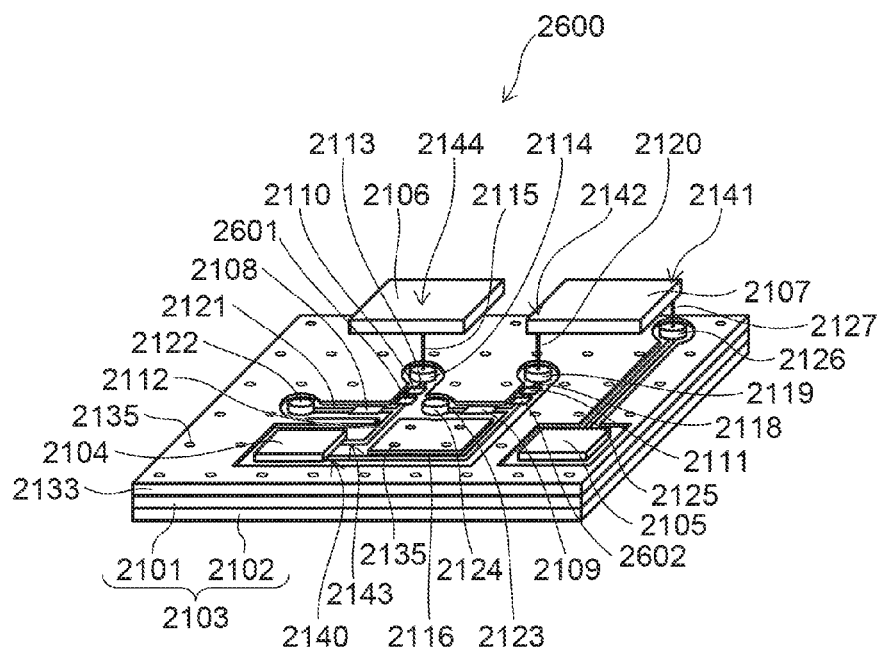
FIG. 28 is a perspective view illustrating a communication device according to the embodiment.

FIG. 28 is a perspective view illustrating a communication device according to the embodiment.

As shown in FIG. 28, compared to the communication device 2100 according to the eighth embodiment (referring to FIG. 18), the communication device 2600 according to the embodiment differs in that an inductive element 2601 and an inductive element 2602 are provided, where an end of the inductive element 2601 is connected in series with the resistance element 2110, another end of the inductive element 2601 is connected to the capacitance element 2108 and the biological signal sensor 2104, an end of the inductive element 2602 is connected in series with the resistance element 2111, and another end of the inductive element 2602 is connected to the capacitance element 2109 and the biological signal sensor 2104. The inductive elements 2601 and 2602 are, for example, chip inductors.

Figure 29:
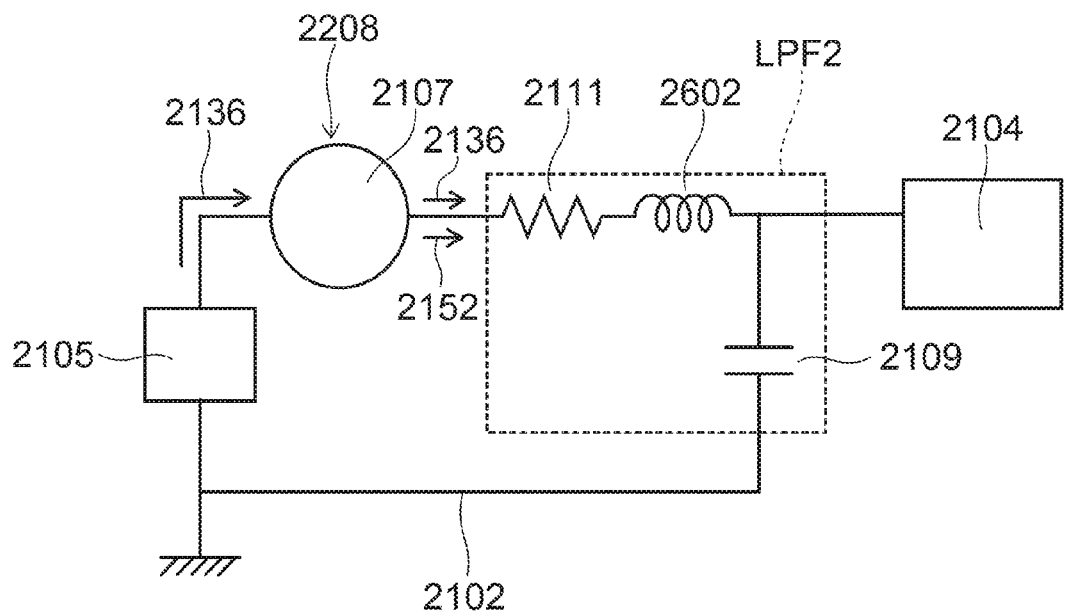
FIG. 29 is a circuit diagram illustrating the operation of the communication device according to the embodiment.

FIG. 29 is a circuit diagram illustrating the operation of the communication device according to the embodiment. However, in FIG. 29, only the communication circuit 2105, the signal electrode 2107, the resistance element 2111, the inductive element 2602, the capacitance element 2109, and the biological signal sensor 2104 are shown; and the other constituents are not illustrated.

As shown in FIG. 29, a low-pass filter LPF2 is formed of the resistance element 2111, the inductive element 2602, and the capacitance element 2109. By providing the inductive element 2602 in the low-pass filter LPF2, the resistance value of the resistance element 2111 can be set to be low. Thereby, the insertion loss of the low-pass filter LPF2 can be reduced.

Also, the combined capacitance of a capacitance element 2209 and the capacitance 2208 formed between the signal electrode 2107 and the ground unit 2102 can be reduced by the inductive element 2602. Thereby, even more stable communication can be performed.

Otherwise, the configuration, the operations, and the effects of the embodiment are similar to those of the eighth embodiment described above.

A tenth embodiment will now be described.

Figure 30:
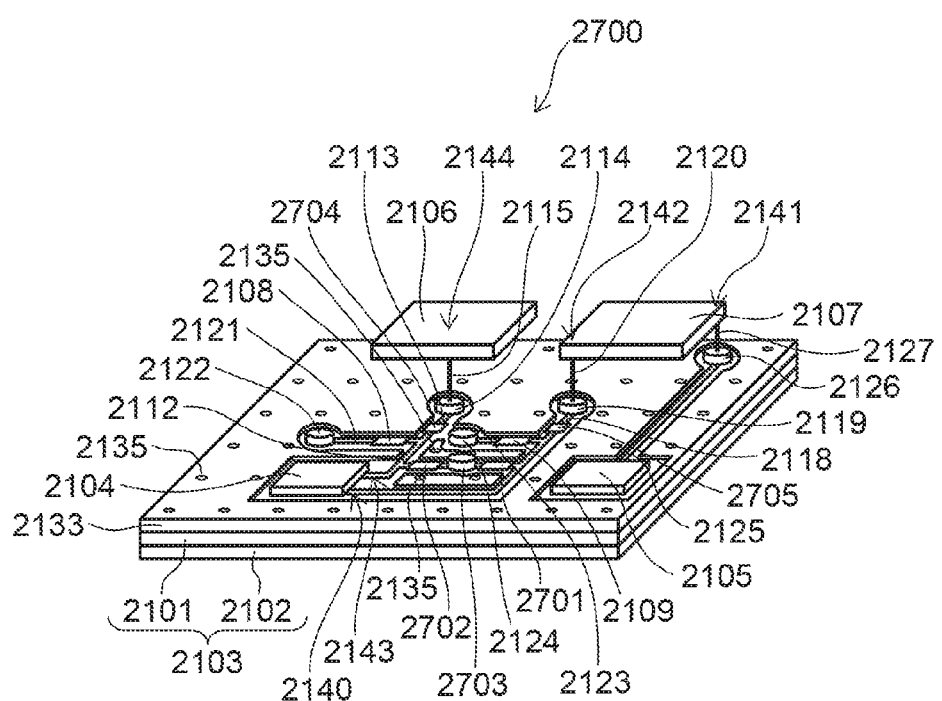
FIG. 30 is a perspective view illustrating a communication device according to the embodiment.

FIG. 30 is a perspective view illustrating a communication device according to the embodiment.

As shown in FIG. 30, (a) to (d) of the communication device 2700 according to the embodiment recited below are different from the communication device 2100 according to the eighth embodiment.

(a) An inductive element 2704 is provided instead of the resistance element 2110.

(b) An inductive element 2705 is provided instead of the resistance element 2111.

(c) A resistance element 2702 is provided, in which an end of the resistance element 2702 is connected in parallel with the capacitance element 2108, and another end of the resistance element 2702 is connected to the ground unit 2102 by a via 2703.

(d) A resistance element 2701 is provided, in which an end of the resistance element 2701 is connected in parallel with the capacitance element 2109, and another end of the resistance element 2701 is connected to the ground unit 2102 by the via 2703.

The inductive elements 2704 and 2705 are, for example, chip inductors.

Figure 31:
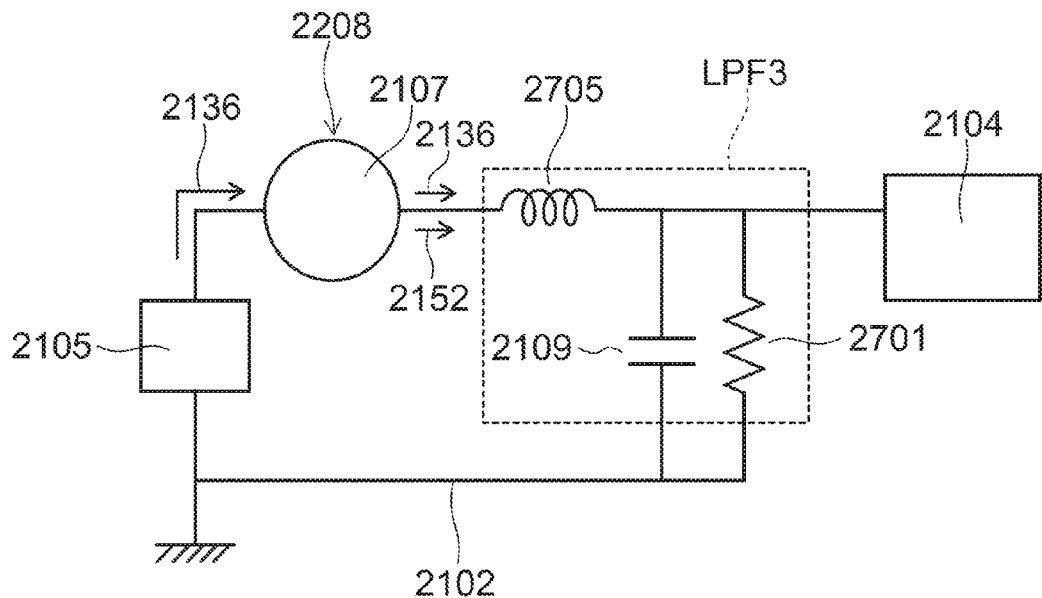
FIG. 31 is a circuit diagram illustrating the operation of the communication device according to the embodiment.

FIG. 31 is a circuit diagram illustrating the operation of the communication device according to the embodiment. However, in FIG. 31, only the communication circuit 2105, the signal electrode 2107, the inductive element 2705, the capacitance element 2109, the resistance element 2701, and the biological signal sensor 2104 are shown; and the other constituents are not illustrated.

As shown in FIG. 31, a low-pass filter LPF3 is formed of the inductive element 2705, the capacitance element 2109, and the resistance element 2701. By providing the inductive element 2705 instead of the resistance element 2111, the insertion loss of the low-pass filter LPF3 can be reduced.

Also, the combined capacitance of the capacitance element 2109 and the capacitance 2208 formed between the signal electrode 2107 and the ground unit 2102 can be reduced by the inductive element 2705. Thereby, even more stable communication can be performed.

Otherwise, the configuration, the operations, and the effects of the embodiment are similar to those of the eighth embodiment described above.

An eleventh embodiment will now be described.

Figure 32:
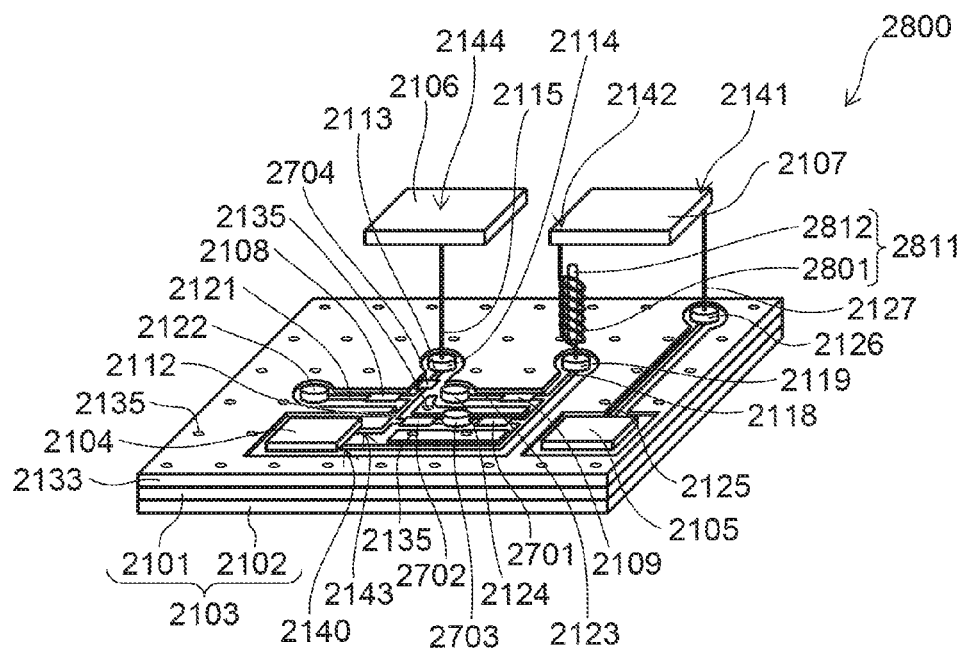
FIG. 32 is a perspective view illustrating a communication device according to the embodiment.

FIG. 32 is a perspective view illustrating a communication device according to the embodiment.

As shown in FIG. 32, compared to the communication device 2700 according to the tenth embodiment described above, the communication device 2800 according to the embodiment differs in that the inductive element 2705 is deleted; and an inductive element 2801 is provided instead of the signal line 2120.

As shown in FIG. 32, the inductive element 2801 includes a winding portion 2811, and a magnetic body 2812 surrounded with the winding portion 2811. The magnetic body 2812 is provided to increase the inductance component. Thereby, the inductive element 2801 becomes an antenna; and the biological signal 2152 generated by the human body can be received. In other words, the biological signal 2152 can be received not only by the signal electrode 2107 but also by the inductive element 2801. As a result, the sensitivity of the biological signal sensor 2104 can be increased. The magnetic body 2812 may not be provided.

Otherwise, the configuration, the operations, and the effects of the embodiment are similar to those of the tenth embodiment described above.

According to the multiple embodiments described above, a communication device including a signal electrode having a low return loss can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The embodiments described above can be implemented in combination with each other. For example, the second example and the eighth example can be combined. As other combinations, for example, the second example and the ninth example, the second example and the tenth example, the second example and the eleventh example, the third example and the eighth example, the third example and the ninth example, the third example and the tenth example, the third example and the eleventh example, the fourth example and the eighth example, the fourth example and the ninth example, the fourth example and the tenth example, the fourth example and the eleventh example, the fifth example and the eighth example, the fifth example and the ninth example, the fifth example and the tenth example, the fifth example and the eleventh example, the sixth example and the eighth example, the sixth example and the ninth example, the sixth example and the tenth example, the sixth example and the eleventh example, the seventh example and the eighth example, the seventh example and the ninth example, the seventh example and the tenth example, or the seventh example and the eleventh example can be combined.

What is claimed is:

1. A communication device, comprising:
    a ground unit having a reference potential applied thereto;
    a dielectric plate provided on the ground unit;
    a communication circuit being provided on the dielectric plate and performing a transmission and a reception of a signal;
    a conductor connected to the communication circuit; and
    a capacitance element having a first capacitance value, an end of the capacitance element being connected to the conductor, another end of the capacitance element being connected to the ground unit,
    a second capacitance value formed between the conductor and the ground unit when there is no human body touching or approximating to the conductor,
    a third capacitance value formed between the conductor and the ground unit when there is a human body touching or approximating to the conductor, and
    the first capacitance value being smaller than the second capacitance value and being greater than the third capacitance value.

2. The communication device according to claim 1, further comprising a first winding connected between the conductor and the communication circuit.

3. The communication device according to claim 2, further comprising a first magnetic body disposed in an interior of the first winding.

4. The communication device according to claim 2, wherein the first winding is provided outside the ground unit when viewed from above.

5. The communication device according to claim 2, further comprising a second winding connected in series with the first winding, a central axis of the first winding and a central axis of the second winding crossing each other.

6. The communication device according to claim 1, further comprising a meandering conductive line connected between the conductor and the communication circuit.

7. The communication device according to claim 6, further comprising a second magnetic body provided under the meandering conductive line.

8. The communication device according to claim 1, further comprising a chip inductor provided on the dielectric plate and connected between the communication circuit and the conductor.

9. The communication device according to claim 1, further comprising:
a first signal line contacting the dielectric plate and being connected to the communication circuit; and
a second signal line connected between the first signal line and the conductor and separated from the dielectric plate,
a total length of the second signal line and the conductor being less than 0.25 times a wavelength of the signal.

10. The communication device according to claim 1, wherein a distance between the second signal line and the dielectric plate is not more than 0.15 times a wavelength of the signal.

11. The communication device according to claim 1, wherein
the conductor includes:
a first portion connected to the communication circuit; and
a second portion separated from the first portion and connected to the capacitance element,
a capacitance being formed between the first portion and the second portion.

12. The communication device according to claim 1, further comprising:
an inductive element connected in series between the conductor and the capacitance element;
a biological signal sensor provided on the dielectric plate and connected to a signal line connecting the capacitance element and the inductive element; and
a resistance element, an end of the resistance element being connected to the signal line, another end of the resistance element being connected to the ground unit.

13. The communication device according to claim 12, wherein the inductive element includes a winding.

14. The communication device according to claim 13, wherein the inductive element includes a magnetic body disposed in an interior of the winding.

15. A biological signal monitoring device, comprising:
a ground unit having a reference potential applied thereto;
a dielectric plate provided on the ground unit;
a communication circuit being provided on the dielectric plate and performing a transmission and a reception of a signal;
a conductor connected to the communication circuit;
a resistance element connected in series with the conductor;
a capacitance element having a first capacitance value, an end of the capacitance element being connected to the conductor in series via the resistance element, another end of the capacitance element being connected to the ground unit; and
a biological signal sensor provided on the dielectric plate and connected to a signal line connecting the capacitance element and the resistance element, a second capacitance value formed between the conductor and the ground unit when there is no human body touching or approximating to the conductor,
a third capacitance value formed between the conductor and the ground unit when there is a human body touching or approximating to the conductor, and
the first capacitance value being smaller than the second capacitance value and being greater than the third capacitance value.

16. The biological signal monitoring device according to claim 15, wherein a frequency of the signal is higher than a frequency of a biological signal generated by the human body.

17. The biological signal monitoring device according to claim 15, wherein a first connection position and a second connection position exist on a line segment on a surface of the conductor including the first connection position and the second connection position, the line segment including two points arbitrarily selected to maximize the length between the two points, the first connection position being where the conductor and the communication circuit are connected, the second connection position being where the conductor and the capacitance element are connected.

18. The biological signal monitoring device according to claim 15, further comprising:
a biological signal conductor provided to be separated from the dielectric plate and the conductor;
a biological signal resistance element connected to the biological signal conductor; and
a biological signal capacitance element having a fourth capacitance value, an end of the biological signal capacitance element being connected to the biological signal conductor in series via the biological signal resistance element, another end of the biological signal capacitance element being connected to the ground unit,
a biological-signal signal line connecting the biological signal capacitance element and the biological signal resistance element and being connected to the biological signal sensor,
a fifth capacitance value formed between the biological signal conductor and the ground unit when there is no human body touching or approximating to the biological signal conductor,
a sixth capacitance value formed between the biological signal conductor and the ground unit when there is a human body touching or approximating to the biological signal conductor, and
the fourth capacitance value being smaller than the fifth capacitance value and being greater than the sixth capacitance value.

19. The biological signal monitoring device according to claim 15, further comprising a plurality of biological signal circuits,
each of the biological signal circuits including:
one biological signal conductor connected to the communication circuit;
one biological signal resistance element, an end of the one biological signal resistance element being connected to the one biological signal conductor, another end of the one biological signal resistance element being connected to the biological signal sensor; and
one biological signal capacitance element having a fourth capacitance value, an end of the one biological signal capacitance element being connected to one biological-signal signal line connecting the one biological signal resistance element and the biological signal sensor, another end of the one biological signal capacitance element being connected to the ground unit, a fifth capacitance value formed between the one biological signal conductor and the ground unit when there is no human body touching or approximating to the one biological signal conductor, a sixth capacitance value formed between the one biological signal conductor and the ground unit when there is a human body touching or approximating to the one biological signal conductor, and the fourth capacitance value being smaller than the fifth capacitance value and being greater than the sixth capacitance value.

20. The biological signal monitoring device according to claim 15, further comprising an inductive element, an end of the inductive element being connected in series with the resistance element, another end of the inductive element being connected to the capacitance element and the biological signal sensor.

* * * * *